(12) United States Patent
Yabe

(10) Patent No.: US 8,947,701 B2
(45) Date of Patent: Feb. 3, 2015

(54) SERVER APPARATUS, TERMINAL APPARATUS, AND PRINTING SYSTEM AND DATA CONVERSION METHOD THEREOF

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 13/061,903

(22) PCT Filed: Dec. 1, 2010

(86) PCT No.: PCT/JP2010/071939
§ 371 (c)(1),
(2), (4) Date: Mar. 2, 2011

(87) PCT Pub. No.: WO2011/080994
PCT Pub. Date: Jul. 7, 2011

(65) Prior Publication Data
US 2011/0242594 A1 Oct. 6, 2011

(30) Foreign Application Priority Data
Dec. 28, 2009 (JP) .................................. 2009-298833

(51) Int. Cl.
*G06F 3/12* (2006.01)
*G06K 15/10* (2006.01)
(Continued)

(52) U.S. Cl.
CPC ............ *G06F 3/1271* (2013.01); *G06F 3/1211* (2013.01); *G06F 3/1236* (2013.01); *G06F 3/1287* (2013.01); *G06F 3/121* (2013.01);
(Continued)

(58) Field of Classification Search
USPC ........................................................ 709/219
See application file for complete search history.

(56) References Cited

U.S. PATENT DOCUMENTS 6,493,000 B1 * 12/2002 Wynn et al. .................... 715/733
6,778,289 B1 * 8/2004 Iwata ........................... 358/1.15
(Continued)

FOREIGN PATENT DOCUMENTS

JP 2007-295283 11/2001
JP 2003-22165 1/2003
(Continued)

OTHER PUBLICATIONS

U.S. Appl. No. 13/081,086, filed April 6, 2011.
(Continued)

*Primary Examiner* — Marivelisse Santiago Cordero
*Assistant Examiner* — Temitayo Folayan
(74) *Attorney, Agent, or Firm* — Fitzpatrick, Cella, Harper & Scinto

(57) ABSTRACT

For a web application requiring a time to execute processing, it is necessary to maintain Internet connection between a web browser and the web application until the processing is completed. Conventionally, the connection is maintained by causing the web browser to inquire a web application server about the execution state of the processing at regular intervals. In this case, however, the web browser cannot execute another different web application until the processing in the web application server is completed. In this invention, a web application server provides processing of converting from document data into print data as a software process asynchronous to a web application and the web application only accepts an execution request for the conversion processing.

6 Claims, 19 Drawing Sheets

(51) Int. Cl.
*G06F 17/00* (2006.01)
*G06F 15/16* (2006.01)

(52) U.S. Cl.
CPC .............. *G06F3/1247* (2013.01); *G06F 3/1265* (2013.01); *G06F 3/1272* (2013.01); *G06F 3/1289* (2013.01)
USPC .......... 358/1.15; 358/1.16; 358/1.8; 715/239; 709/219

(56) References Cited

U.S. PATENT DOCUMENTS

| | | |
|---|---|---|
| 7,259,882 B2 | 8/2007 | Tsuda |
| 2003/0189739 A1* | 10/2003 | Yamaguchi et al. .......... 358/527 |
| 2007/0279685 A1 | 12/2007 | Tsuda |
| 2007/0291286 A1* | 12/2007 | Utsunomiya et al. .......... 358/1.8 |
| 2009/0080021 A1* | 3/2009 | Matsugashita ................ 358/1.15 |
| 2009/0249194 A1* | 10/2009 | Day .............................. 715/239 |

FOREIGN PATENT DOCUMENTS

| | | |
|---|---|---|
| JP | 2004-362362 | 12/2004 |
| JP | 2005-50044 | 2/2005 |
| JP | 2007-55051 | 3/2007 |

OTHER PUBLICATIONS

Japanese Office Action dated Sep. 27, 2013 issued during prosecution of related Japanese application No. 2009-298833.

* cited by examiner

FIG. 6

| DOCUMENT MANAGEMENT TABLE 601 | | | | |
|---|---|---|---|---|
| DOCUMENT ID 602 | DOCUMENT NAME 603 | DOCUMENT MANAGEMENT DB ITEM 1 604 | ... | DOCUMENT MANAGEMENT DB ITEM N 605 |
| 1 | Document1 | XXX | ... | YYY |
| | | | | DOCUMENT DATA |
| | | | | DATA |

| HISTORY ID | DOCUMENT ID | PRINT DATA | PRINTING APPARATUS INFORMATION | STORAGE LOCATION INFORMATION WITHIN STORAGE UNIT OF PRINTING APPARATUS |
|---|---|---|---|---|
| 15011 | 15012 | 15013 | 15014 | 15015 |
| 1 | 1 | BINARY DATA | MFP001 (APPARATUS NAME) / IP ADDRESS | XXX / YYY / ZZZ |

PRINT DATA HISTORY TABLE 1501

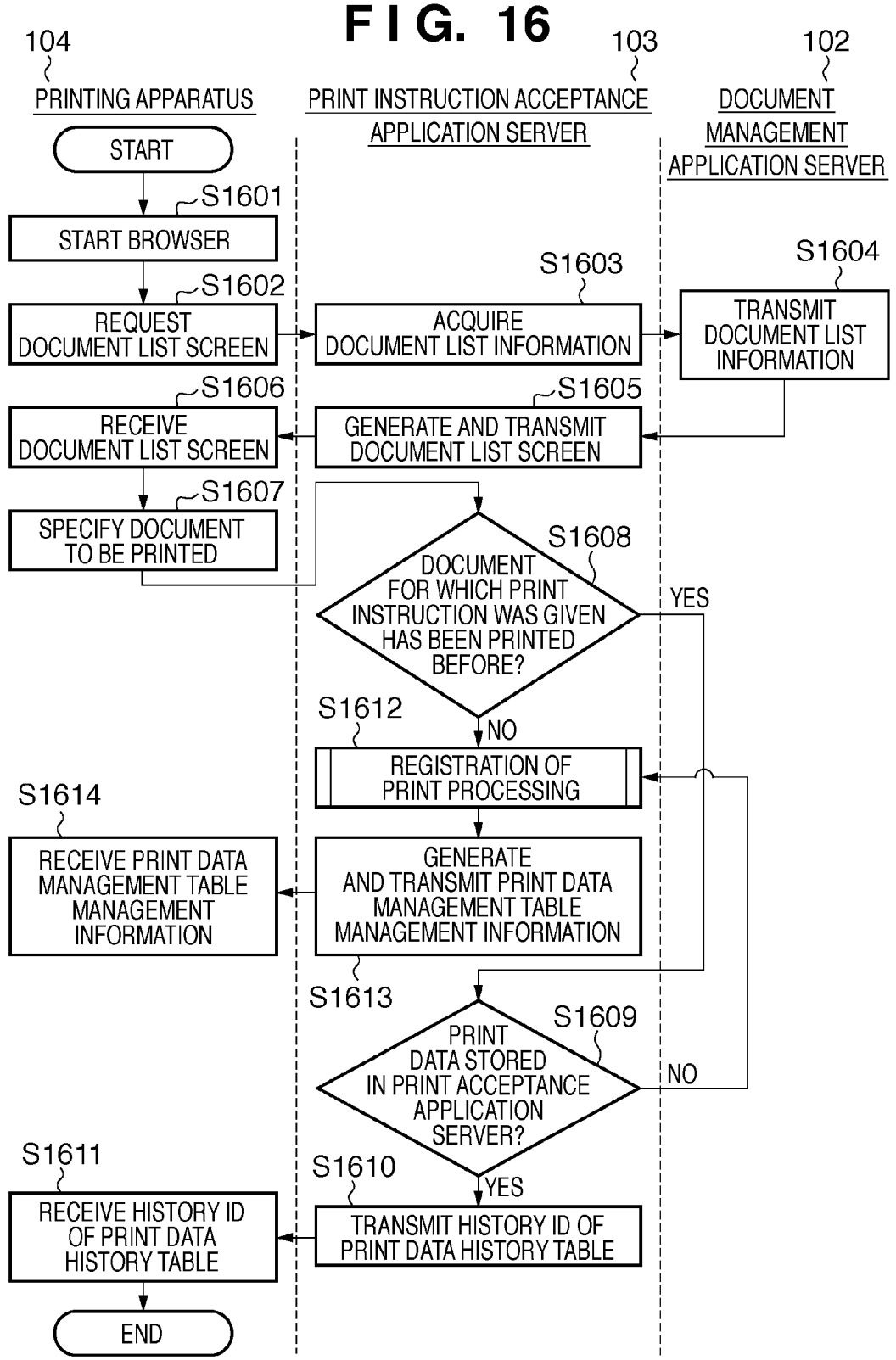

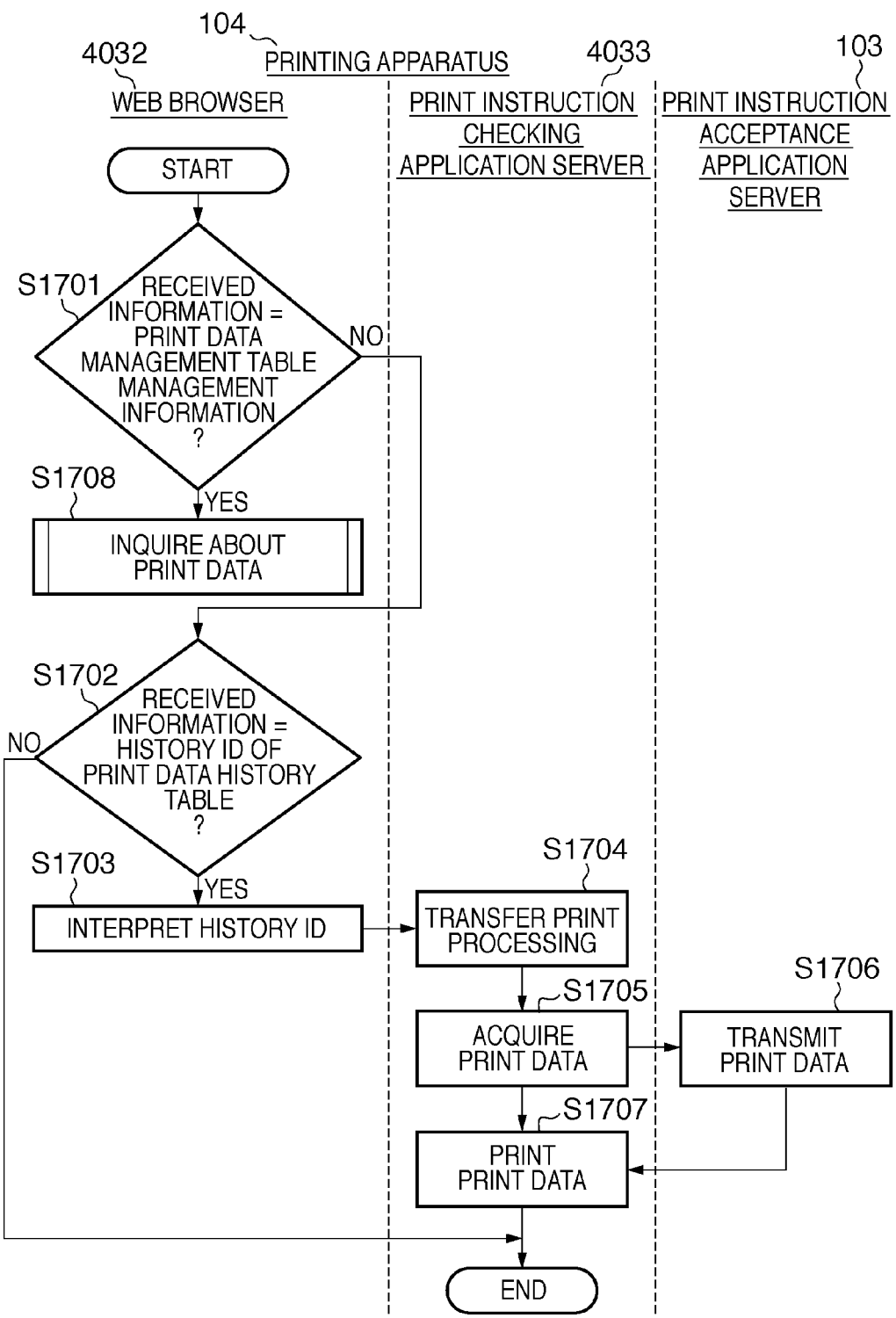

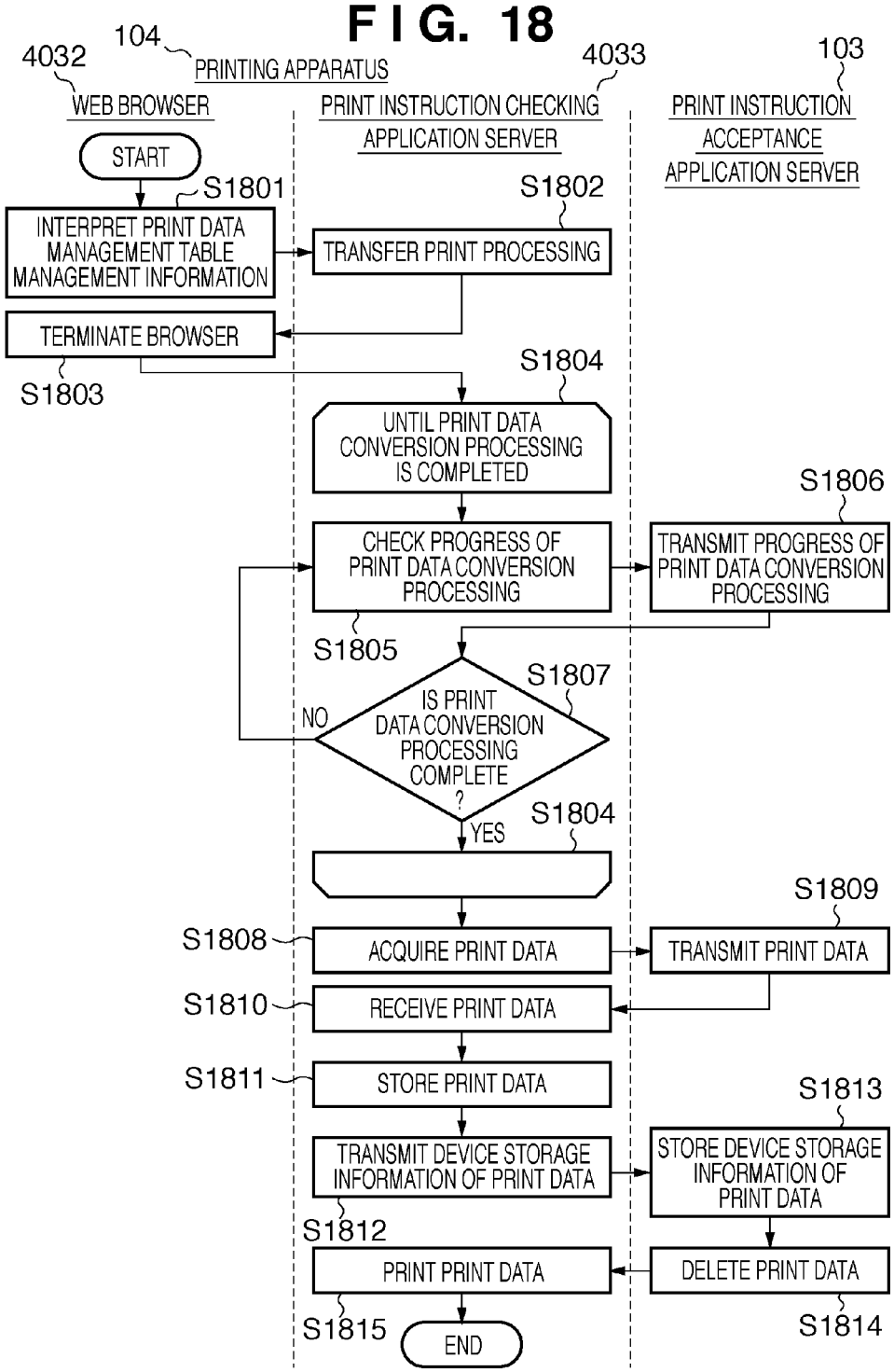

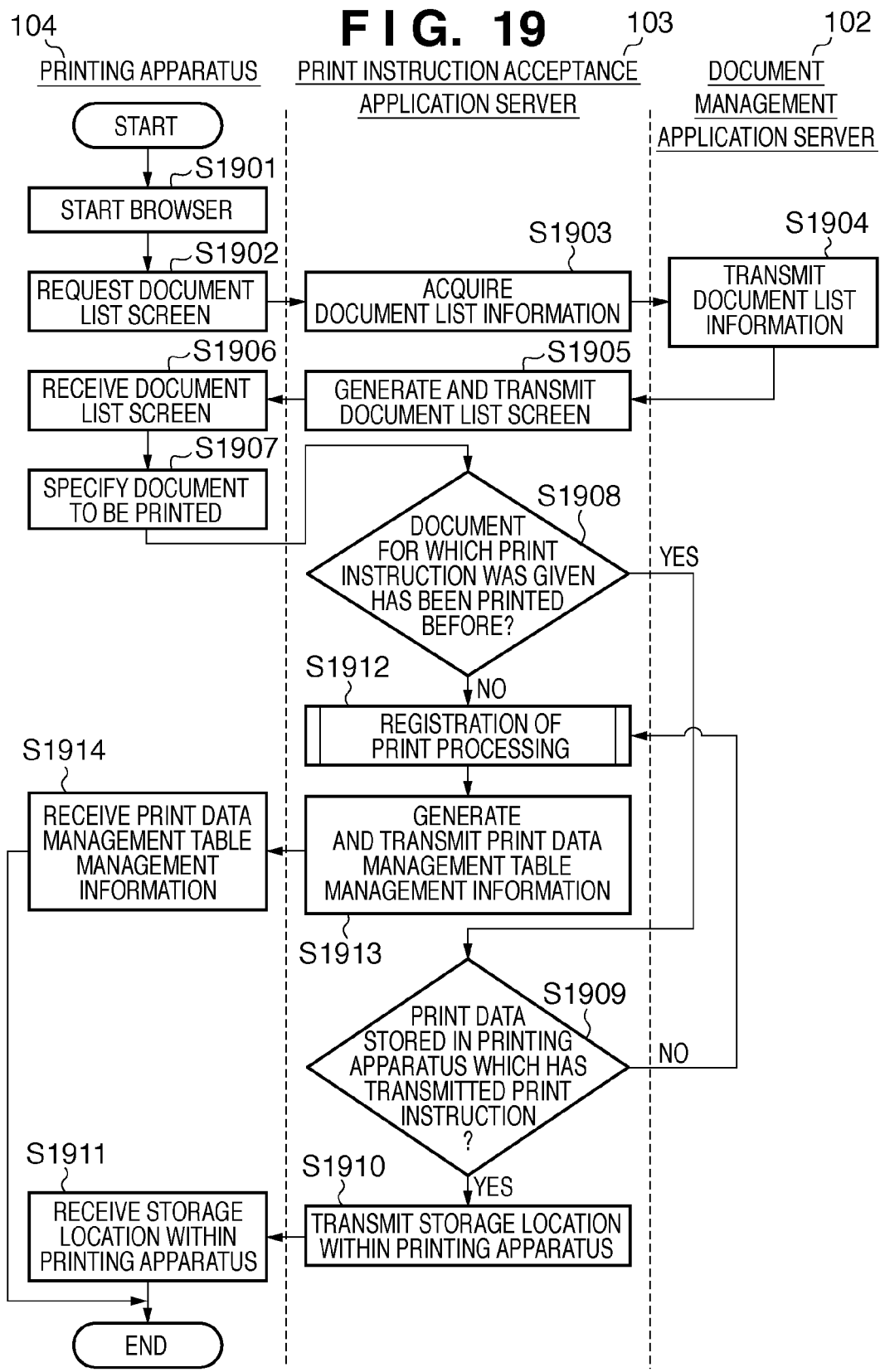

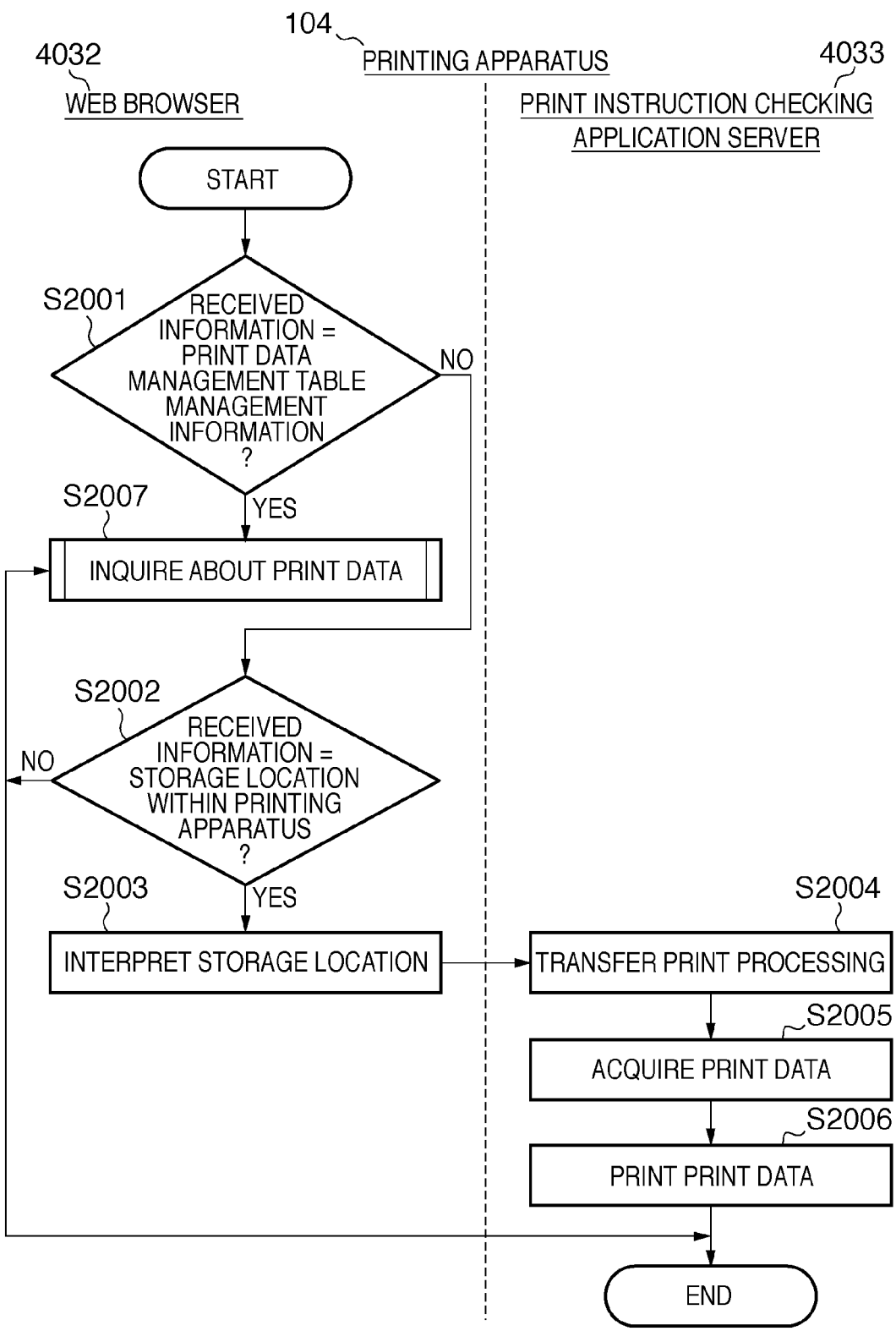

SERVER APPARATUS, TERMINAL APPARATUS, AND PRINTING SYSTEM AND DATA CONVERSION METHOD THEREOF

This application is a National Stage application under 35 U.S.C. §371 of International Application No. PCT/JP2010/071939, filed on Dec. 1, 2010, which claims priority to Japanese Application No. 2009-298833, filed Dec. 28, 2009, the contents of each of the foregoing applications being incorporated by reference herein.

TECHNICAL FIELD

The present invention relates to a server apparatus, a terminal apparatus, a printing system and a data conversion method thereof, as well as for creating and printing print data in, for example, a cloud computing environment.

BACKGROUND ART

Today, applications (to be referred to as web applications hereinafter) that use, via a web browser installed on a client computer, functions provided via a network by web application servers prevail. In recent years, in addition to applications, cloud computing which provides even hardware environments of web application servers is becoming common. Representative examples of cloud computing are Amazon Web Services® provided by Amazon technologies, Inc. and Windows Azure® provided by Microsoft Corporation.

It is expected that processing which has been conventionally implemented by installing a specific application on a client terminal will be provided as a web application using cloud computing. In this case, the client can receive a service by only installing a web browser, and need not install a specific application.

Under the circumstance, providing, as a web application, a driver application program which converts document data created by an application program into print data interpretable and printable by a printing apparatus is being studied. When a driver application program is provided as a web application, and cooperates with an existing document management web application, it is possible to directly browse, select, edit, and print a document managed by a server from a printing apparatus installed with a web browser. It may take a certain time until the driver application program completes the processing of converting document data into print data. In addition to the driver application program, there are other web applications that require a long time for processing. If the client uses such a web application, the elapsed time may exceed a web browser response time limit while the server executes the web application, and a time-out may occur. In this case, since a time-out may occur even when the processing is being normally executed, it is necessary to perform the processing considering the possibility that the processing time of the server exceeds the web browser response time limit.

Polling is a conventional technique to prevent time-out from occurring when the server takes a long time to carry out processing (see, for example, Japanese Patent Laid-Open No. 2003-022165). Polling is a method in which a web browser inquires a web application server at regular intervals about the execution state of processing during execution of the processing. In polling, if the web browser issues a request to the server, the server returns a response without waiting for completion of processing of the request. After that, the web browser issues a request to inquire the server whether the processing is complete, at intervals such that a time-out does not occur, for example, at regular intervals. In response to it, if the processing is complete, the server returns a response indicating completion to the web browser, and if the processing is incomplete, the server returns a response indicating incompletion. This completes a request-response operation between the server and the web browser in a short time, thereby preventing a time-out at an HTTP or higher layer, for example. Furthermore, polling is effective for allowing data received from the server to pass through the firewall of the client.

SUMMARY OF INVENTION

The present invention provides a server apparatus, a terminal apparatus, and a printing system and a data conversion method thereof, which can efficiently use resources.

The present invention has the following configuration.

According to an aspect of the present invention, there is provided a terminal apparatus connected with a server apparatus, comprising: browser means for transmitting, to the server apparatus, a conversion request to convert specified document data into print data printable by a printing apparatus, and receiving a reception response to the conversion request from the server apparatus; and progress checking means for transmitting, to the server apparatus, a progress information request to inquire progress of conversion processing which is executed by the server apparatus in response to the conversion request for specific document data, and receiving progress information as a response to the progress information request or print data after the conversion processing from the server apparatus, wherein upon reception of the reception response from the server apparatus, the browser means instructs the progress checking means to inquire the progress of the conversion processing by regarding, as the specific document data, the document data specified in the conversion request.

According to another aspect of the present invention, there is provided a server apparatus connected with a terminal apparatus, comprising: means for transmitting to the terminal apparatus, upon reception of a conversion request from the terminal apparatus to convert specified document data into print data printable by a printing apparatus, a reception response indicating that the conversion request has been received; conversion means for executing, upon reception of the conversion request, conversion processing for converting the document data into the print data in response to the conversion request; and means for transmitting to the terminal apparatus, upon reception of a progress information request from the terminal apparatus to inquire progress of conversion processing according to the conversion request, print data after the conversion processing if the conversion processing is complete, and progress information indicating the progress of the conversion processing if the conversion processing is incomplete.

According to still another aspect of the present invention, there is provided a printing system which connects one or more server apparatuses with a terminal apparatus via a communication network, one of the one or more server apparatuses comprising means for transmitting to the terminal apparatus, upon reception of a conversion request from the terminal apparatus to convert specified document data into print data printable by a printing apparatus, a reception response indicating that the conversion request has been received, conversion means for executing, upon reception of the conversion request, conversion processing for converting the document data into the print data in response to the conversion request, and means for transmitting to the terminal apparatus, upon reception of a progress information request from the terminal apparatus to inquire progress of conversion processing according to the conversion request, print data after the conversion processing if the conversion processing is complete, and progress information indicating the progress of the conversion processing if the conversion processing is incomplete, and the terminal apparatus comprising browser means for transmitting, to one of the one or plurality of server apparatuses, a conversion request to convert specified document data into print data printable by a printing apparatus, and receiving a reception response to the conversion request from the server apparatus, and progress checking means for transmitting, to one of the one or plurality of server apparatuses, a progress information request to inquire progress of conversion processing which is executed by the server apparatus in response to the conversion request for specific document data, and receiving progress information as a response to the progress information request or print data after the conversion processing from one of the one or more server apparatuses, wherein upon reception of the reception response from one of the one or more server apparatuses, the browser means instructs the progress checking means to inquire the progress of the conversion processing by regarding, as the specific document data, the document data specified in the conversion request.

With the present invention, even if the browser of a terminal apparatus requests a server apparatus to perform conversion processing, it is possible to disconnect the browser and the server apparatus before the processing completes. Consequently, it is possible to avoid a printing apparatus from being occupied by the user who uses a web application provided by the server apparatus, thereby effectively using the resources of the printing apparatus.

Further features of the present invention will become apparent from the following description of exemplary embodiments with reference to the attached drawings.

BRIEF DESCRIPTION OF DRAWINGS

FIG. 6 is a view for explaining a document management table 601 in the document management application server 102;

FIG. 15 is a table for explaining a print data history table 1501 in a print instruction acceptance application server 103;

FIG. 16 is a flowchart for explaining processing until document data to be reprinted is selected in the second embodiment;

FIG. 17 is a flowchart for explaining processing until the printing apparatus 104 prints reprint data in the second embodiment;

FIG. 18 is a flowchart for explaining processing until a printing apparatus 104 prints print data in the third embodiment;

FIG. 19 is a flowchart for explaining processing until document data to be reprinted is selected in the third embodiment; and FIG. 20 is flowchart for explaining processing until the printing apparatus 104 prints reprint data in the third embodiment.

DESCRIPTION OF EMBODIMENTS

If polling is used as described in the conventional example, during polling a web browser must substantially be kept connected to a web application server which is executing processing. That is, in order to maintain association of the processing requested by the web browser to the server with data obtained when the server executes the processing, the web browser needs to maintain the connection during the processing.

If a web driver application requires a relatively long time for processing and provides a service including completion acknowledgement and data reception, as described above, the web browser cannot receive a service from another server until it acknowledges completion or receives data. Since it is impossible to terminate the web browser during polling, a user using the web application occupies the web browser. Also, if a user interrupts a web browser serving as an interface via which another user uses a web application, the other user cannot obtain a processing result from the web application with which he/she connects via the interrupted web browser.

Such problem arises every time a web browser requests a server to perform a service requiring a long time, for example, conversion from document data into print data. It is impossible to use the available resources (for example, a web browser or a server which provides a web application via a web browser) of a printing apparatus even during the latency of processing by the server, thereby significantly decreasing the use efficiency of the printing apparatus. Embodiments for solving the above problem will be described below.

[First Embodiment]

<System Configuration>

Figure 1:
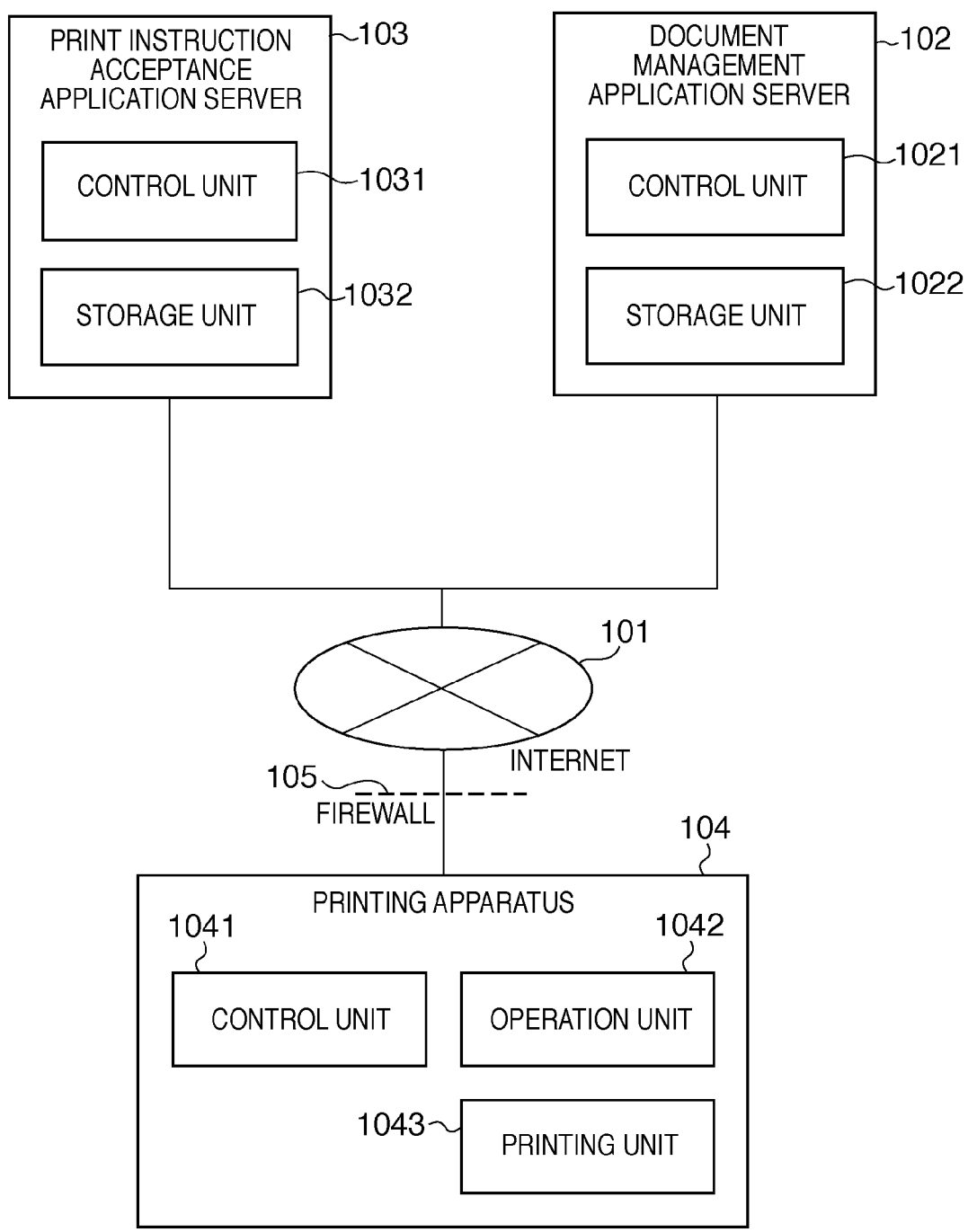
FIG. 1 is a block diagram showing a system configuration.

The best mode for carrying out the present invention will be explained below with reference to the accompanying drawings. FIG. 1 shows the whole configuration of a web printing system according to the first embodiment of the present invention. The web printing system of this embodiment has the Internet 101 serving as a communication network, and one or a plurality of server apparatuses (in this embodiment, a document management application server 102 and a print instruction acceptance application server 103). The system also has a printing apparatus 104 functioning as a client (terminal apparatus) with a printing function, and a firewall 105 capable of implementing, for example, a function of blocking an HTTP request from the Internet side to the printing apparatus 104. An HTTP request and a response are exchanged via the firewall 105. Note that the present invention is applicable to cloud computing.

The Internet 101 serves as a communication line for exchanging information between the above-described apparatuses. A wired or wireless connection is available. For a layer lower than the IP layer, any kind of medium may be used.

The document management application server 102 includes a control unit 1021 and a storage unit 1022, and is also simply referred to as a document management server. The storage unit 1022 stores document data. The document data include PDF files created using software such as Acrobat available from Adobe Systems, and DOC files created using software such as Word available from Microsoft. The control unit 1021 plays a generally well-known role as an application server. For example, a web application program is installed on the storage unit 1022, and the document management application server 102 executes the installed program to provide the printing apparatus 104 with a service. In this case, a group of software processes of the program to be executed are assigned to the control unit 1021, and then performed. Furthermore, the control unit 1021 can execute part of the processes of flowcharts to be disclosed in this embodiment and other embodiments.

The print instruction acceptance application server 103 includes a control unit 1031 and a storage unit 1032. The storage unit 1032 stores a processing request from a web browser 4032 (to be described later), and print data as the execution result of the processing request. The print data, for example, indicates data in a data format interpretable and printable by the printing apparatus 104, such as page description language (PDL) data. In this case, requested processing is conversion processing from document data into print data. This request is also called a conversion request. Data obtained after the conversion processing is print data.

The control unit 1031 of the print instruction acceptance application server 103 plays a generally well-known role as an application server. For example, a web application program which executes processing in response to a processing request from the web browser 4032 is installed on the storage unit 1032, and the print instruction acceptance application server 103 executes the installed program to provide the printing apparatus 104 with a service. In this case, a group of software processes of the program to be executed are assigned to the control unit 1031, and then performed. Furthermore, the control unit 1031 can execute part of the processes of flowcharts to be disclosed in this embodiment and other embodiments.

The printing apparatus 104 includes a control unit 1041, an operation unit 1042, and a printing unit 1043. The printing apparatus 104 serves as an MFP (Multi Function Peripheral) which inputs/outputs and transmits/receives images, and executes various image processes. The control unit 1041 controls the operation unit 1042 and printing unit 1043 as the components of the printing apparatus 104. The operation unit 1042 has a user interface to accept an operation instruction for the printing apparatus 104 from the user. For example, a web browser screen to be performed by the printing apparatus 104 is displayed on the operation unit 1042, and it is possible to request through the screen a server to perform a service. The printing unit 1043 is controlled by the control unit 1041 to execute various image processes and output images.

The firewall 105 serves as an apparatus which restricts accesses from outside via the Internet 101 to provide a higher level of security for the printing apparatus 104. The firewall 105 may be implemented by hardware or software. In this embodiment, therefore, the firewall 105 blocks a request voluntarily sent from a server and the request does not reach the printing apparatus 104.

<Hardware Configuration of Application Server>

Figure 2:
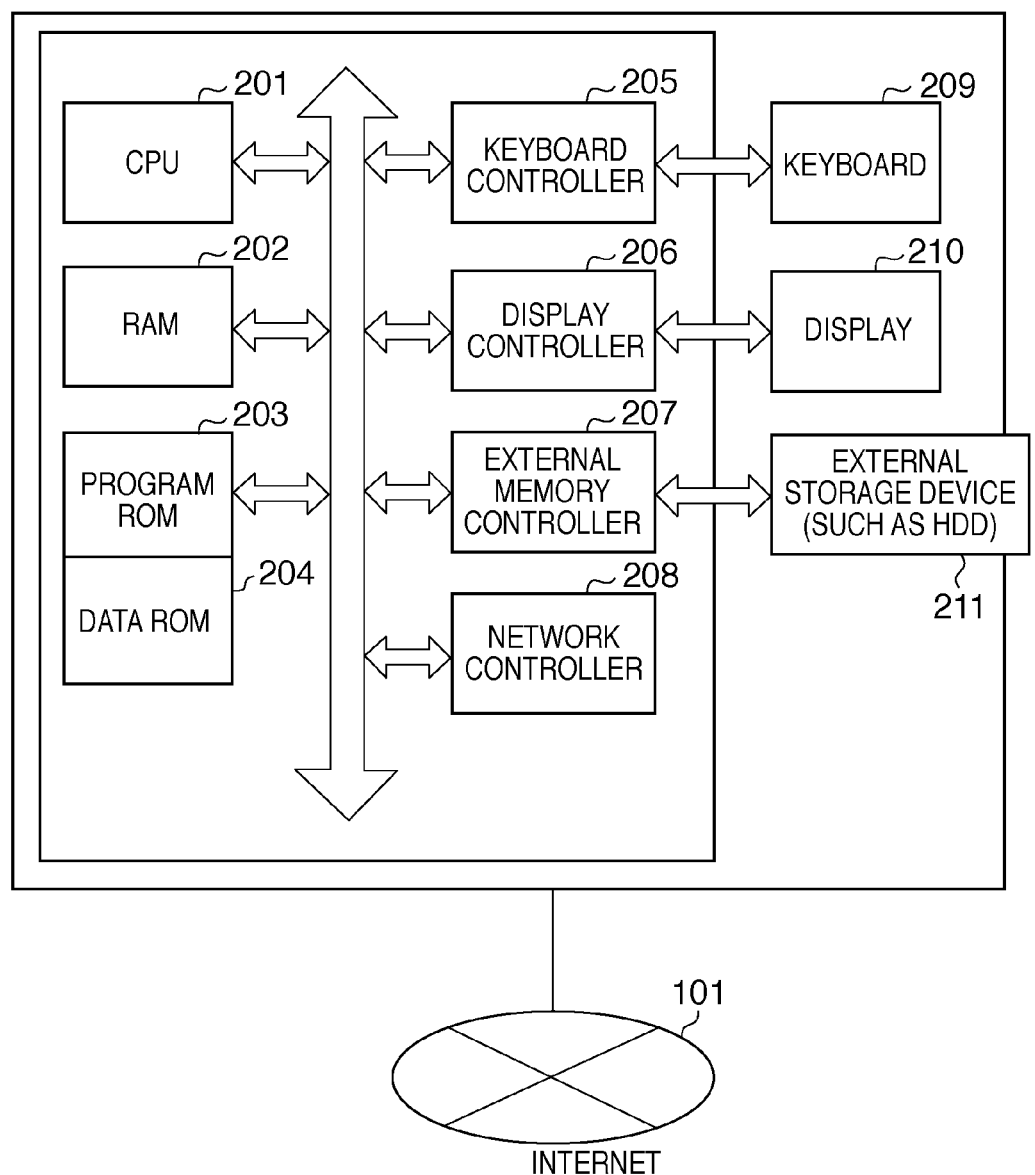
FIG. 2 is a block diagram showing the hardware configuration of a document management application server 102 and print instruction acceptance application server 103.

FIG. 2 shows the hardware configuration of the document management application server 102 and print instruction acceptance application server 103 which constitute the system according to the first embodiment of the present invention. The hardware configuration shown in FIG. 2 corresponds to that of a typical information processing apparatus. The hardware configuration of a typical information processing apparatus is applicable to the document management application server 102 and print instruction acceptance application server 103 in this embodiment of the present invention.

A CPU 201 executes a program such as an operating system (to be referred to as an OS hereinafter) or application which is stored in a program ROM 203 or loaded into a RAM 202 by an external storage device 211. In the document management application server 102 and print instruction acceptance application server 103, each of the control units 1021 and 1031 corresponds to the CPU 201. The CPU 201 executes the processes of flowcharts to be disclosed in the first embodiment and subsequent embodiments. The RAM 202 serves as a main memory or work area for the CPU 201. A keyboard controller 205 controls key inputs from a keyboard 209 or a pointing device (not shown). A display controller 206 controls display of various kinds of displays 210. An external memory controller 207 controls data accesses to an external storage device 211 (for example, a hard disk drive (HDD)) storing various data. In the document management application server 102 and the print instruction acceptance application server 103, each of the storage units 1022 and 1032 corresponds to the external memory controller and external storage device. A network controller 208 connects to the Internet 101, and executes communication control processing with other apparatuses.

<Hardware Configuration of Printing Apparatus>

Figure 3:
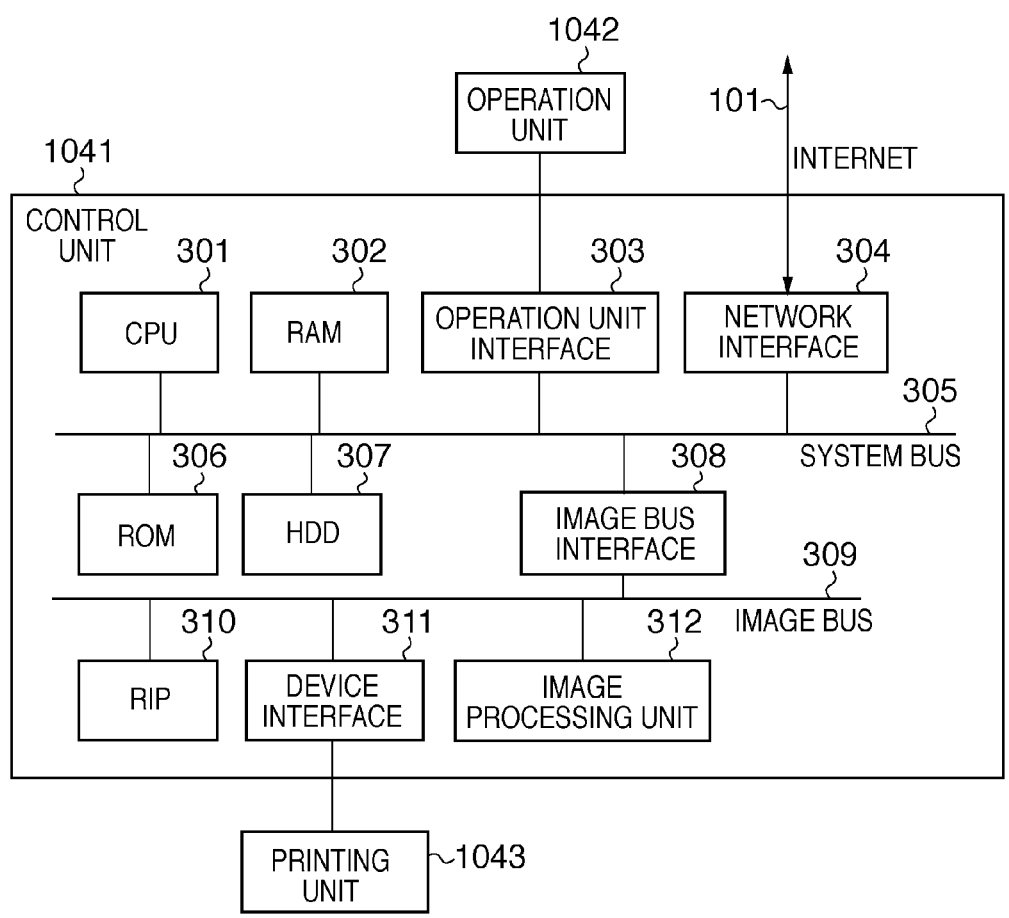
FIG. 3 is a block diagram showing the hardware configuration of a printing apparatus 104.

FIG. 3 shows the hardware configuration of the printing apparatus 104 constituting the system according to the first embodiment of the present invention. The printing apparatus 104 includes the control unit 1041 configured to control the printing apparatus. The control unit 1041 controls the printing unit 1043 serving as an image output device while being connected to a LAN or public network through which the control unit 1041 inputs/outputs image information and device information.

The control unit 1041 has a CPU 301. The CPU 301 connects with a RAM 302, a ROM 306, a hard disk drive (HDD) 307, an image bus interface 308, an operation unit interface 303, and a network interface 304 via a system bus 305. The RAM 302 serves as a main memory, a work area, or an image memory for temporarily storing image data for the CPU 301.

The ROM 306 serves as a boot ROM. The ROM 306 stores the boot program (start-up program) of the printing apparatus. The hard disk drive (HDD) 307 functions as an external storage area storing system software, image data, and the like. The operation unit interface 303 serves as an interface for inputting/outputting to/from the operation unit 1042, which, for example, outputs to the operation unit 1042 image data to be displayed on the operation unit 1042, and transmits to the CPU 301 information which has been input through the operation unit 1042 by the user. The network interface 304 connects to the Internet 101 via the firewall 105 to input/ output information. The image bus interface 308 functions as a bus bridge which connects the system bus 305 with an image bus 309 for transferring image data at high speed, and converts its data structure. The image bus 309 connects a raster image processor (RIP) 310, a device interface 311, and the printing unit 1043 with each other. The RIP 310 converts print data described in PDL or the like or intermediate data obtained by converting the print data into raster data containing pixels. An image processing unit 312 manipulates data to be printed. For the raster data, for example, the image processing unit 312 performs additional image processes such as rotation, conversion, monochrome conversion, and composition processes in addition to processes associated with print processing such as a color adjustment process, various correction processes, and a quantization process. The device interface 311 serves as an interface with the printing unit 1043 functioning as a printer engine, which, for example, sends image data to the printing unit 1043 in synchronism with a synchronizing signal from the printing unit 1043. The printing unit 1043 serves as a printer engine using, for example, an electrophotographic method or inkjet method, which forms an image corresponding to the image data received from the device interface 311 on a medium such as a printing sheet.

<Software Configuration>

Figure 4:
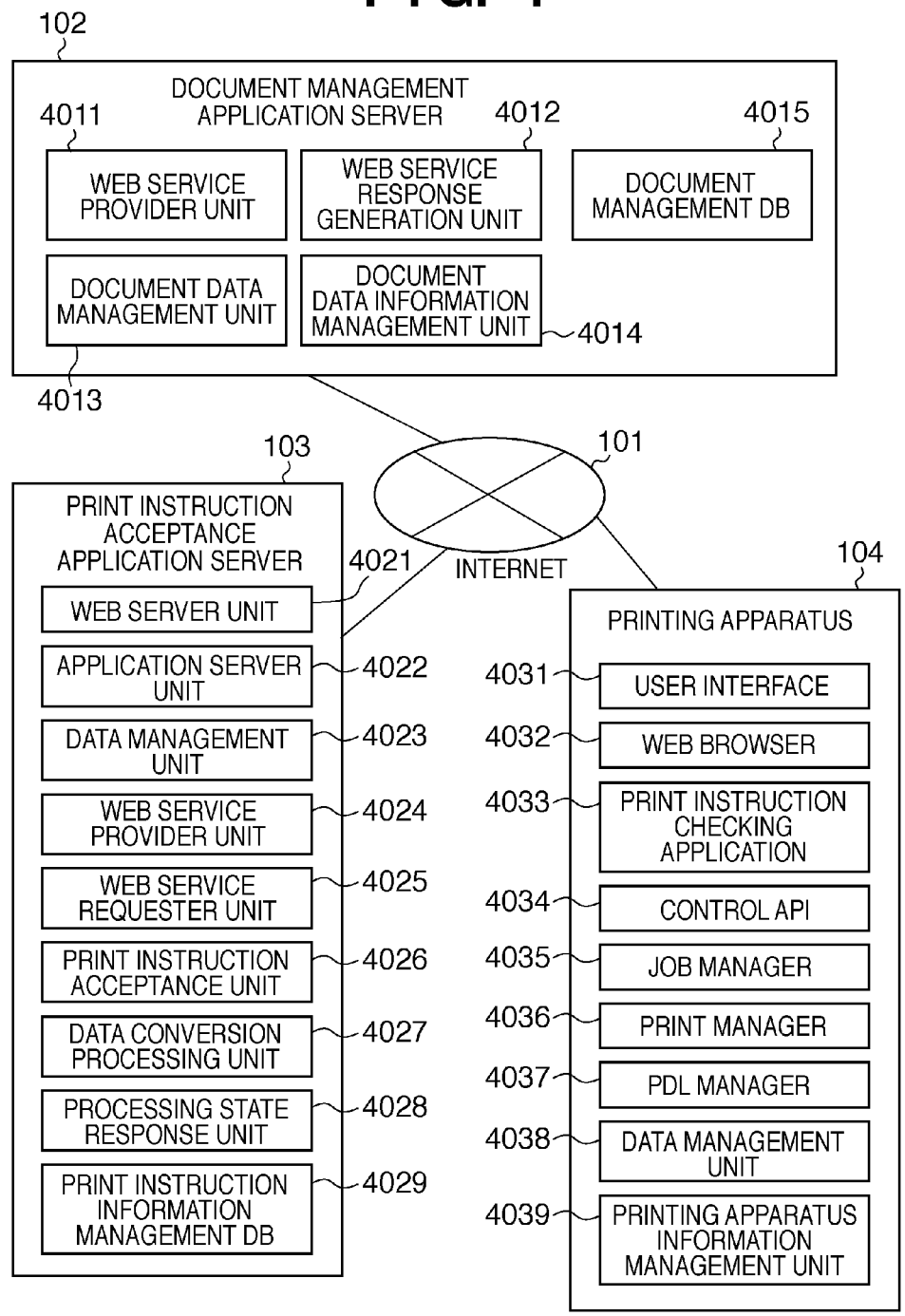
FIG. 4 is a block diagram showing the software configuration of the document management application server 102, print instruction acceptance application server 103, and printing apparatus 104.

FIG. 4 shows the software configuration of each of the document management application server 102, the print instruction acceptance application server 103, and the printing apparatus 104 which constitute the system according to the first embodiment of the present invention.

The document management application server 102 includes a web service provider unit 4011, a web service response generation unit 4012, a document data management unit 4013, and a document data information management unit 4014. The storage unit 1022 (the external storage device 211) stores those components as program files. Various functions provided by the document management application server 102 as web applications are implemented when the program files are loaded into the RAM 202 and executed by the CPU 201.

The web service provider unit 4011 accepts a web service request from a web service requester unit 4025 of the print instruction acceptance application server 103 via the Internet 101. In response to the web service request, the web service response generation unit 4012 performs processing. When executing the processing in response to the web service request, the web service response generation unit 4012 calls the document data management unit 4013 or the document data information management unit 4014 to generate an execution result. The document data management unit 4013 performs processes such as registration, search, and delete processes of document data for a document management database 4015 implemented in the storage unit 1022. The document data information management unit 4014 executes processes such as registration, search, and delete processes for association information related to the document data. Those data are also registered in the document management database 4015. In this embodiment, detailed processing contents executed by the document management application server 102 will be explained in detail when describing flowcharts to be disclosed below.

The print instruction acceptance application server 103 has a web server unit 4021, an application server unit 4022, a data management unit 4023, a web service provider unit 4024, the web service requester unit 4025, a print instruction acceptance unit 4026, a data conversion processing unit 4027, and a processing state response unit 4028. The storage unit 1032 (the external storage device 211) stores those components as program files. Various functions provided by the print instruction acceptance application server 103 as web applications are implemented when the program files are loaded into the RAM 202 and executed by the CPU 201.

The web server unit 4021 accepts an HTTP request from the web browser 4032 of the printing apparatus 104 via the Internet 101. Upon acceptance of the HTTP request, the web server unit 4021 calls the application server unit 4022 to execute processing according to the request. The application server unit 4022 returns dynamically generated response information formed by the HTML or the like to the web server unit 4021 as the execution result of the processing. Upon reception of the execution result from the application server unit, the web server unit 4021 returns the received execution result to the web browser 4032 of the printing apparatus 104. Furthermore, the application server unit 4022 calls an external web service from the web service requester unit 4025 via the Internet 101. In this embodiment, the application server unit 4022 transmits a web service request to the web service provider unit 4011 of the document management application server 102, and receives a response to it.

The web service provider unit 4024 accepts a web service request from a print instruction checking application 4033 of the printing apparatus 104 via the Internet 101. In response to the web service request, the print instruction acceptance unit 4026, the data conversion processing unit 4027, and the processing state response unit 4028 respectively execute processing to return a response to the print instruction checking application 4033 of the printing apparatus 104. The data management unit 4023 is executed when the permanence of data is necessary in executing various processes in the print instruction acceptance application server 103, and writes and loads the data into the storage unit 1032 (the external storage device 211). In this embodiment, detailed processing contents executed by the print instruction acceptance application server 103 will be explained in detail when describing flowcharts to be disclosed hereinafter.

The printing apparatus 104 has a user interface 4031, the web browser 4032, the print instruction checking application 4033, a control API 4034, a job manager 4035, a print manager 4036, a PDL manager 4037, a data management unit 4038, and a printing apparatus information management unit 4039. The hard disk drive (HDD) 307 stores those components as program files. Various functions provided by the printing apparatus 104 are implemented when the program files are loaded into the RAM 302 and executed by the CPU 301.

The user interface 4031 is a program for interfacing between the apparatuses and user operation when the user performs various operations and settings for the printing apparatus 104. The user interface 4031, for example, transfers operation information to various programs (to be described later), and sends a request for executing processing according to each program or performs data settings in accordance with user operation information input through the operation unit 1042.

The web browser 4032 is a program for establishing an HTTP connection with the print instruction acceptance application server 103 via the Internet 101, and executing various processes provided by the print instruction acceptance application server 103. The web browser 4032 is displayed on the operation unit 1042, and accepts an input from the user. As described above, the user operation information input to the web browser is transferred to various programs (to be described later) of the printing apparatus via the user interface 4031. Assume that the web browser transmits an HTTP request. In this case, if the web browser does not receive a response to the request within a time limit, it determines that a time-out has occurred, displays an error, and does not wait anymore. That is, when a time-out occurs, the browser terminates connection with the server (or specified URL).

The print instruction checking application 4033 is a program for transmitting a web service request to the web service provider unit 4024 of the print instruction acceptance application server 103 via the Internet 101, and receiving a response to it.

The control API 4034 provides the print instruction checking application 4033 with an interface for the job manager 4035, print manager 4036, and PDL manager 4037. This enables to reduce dependency between the programs, thereby increasing their reusability.

The job manager 4035 interprets various processes instructed by the print instruction checking application 4033 via the control API 4034, and gives instructions to the print manager 4036 and PDL manager 4037. The job manager 4035 also collectively manages hardware processes executed by the printing apparatus 104.

The print manager 4036 manages and controls print processing instructed by the job manager 4035.

The PDL manager 4037 performs PDL conversion of print data instructed by the job manager 4035. The data management unit 4038 manages and controls data stored in the hard disk drive (HDD) 307. The printing apparatus information management unit 4039 manages the printing apparatus identification information of the printing apparatus 104, installation location information (including information such as an IP address on a network) of the printing apparatus, and the like.

<Web Browser Screen Configuration>

Figure 5:
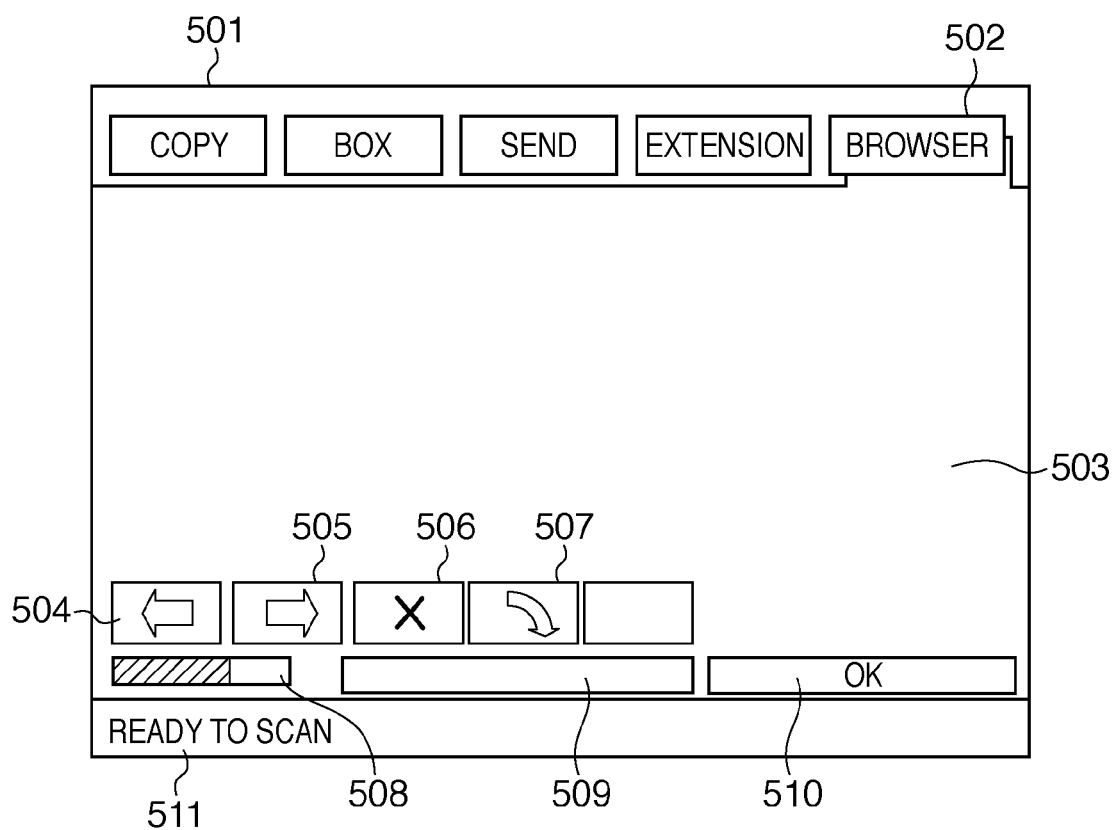
FIG. 5 is a view for explaining the screen configuration of a web browser 4032 displayed on an operation unit 1042 of the printing apparatus 104.

FIG. 5 shows an example of the screen configuration of the web browser 4032 displayed on the operation unit 1042 of the printing apparatus 104 according to the first embodiment. Tabs 502, a URL input field 509, an OK button 510, a progress bar 508, a content display area 503, a back button 504, a forward button 505, a reload button 507, a stop button 506, and a status notification area 511 are displayed on a web browser screen 501.

The tabs 502 are used for screen switching between the function of the web browser 4032 and other functions (copy, box, send, and extension) provided by the printing apparatus 104. The URL input field 509 is used for inputting a desired resource URL by the user. When the user presses the field, a virtual full keyboard (not shown) is displayed for inputting characters. The user can input a desired character string using soft keys imitating a keytop arranged on the virtual full keyboard.

The OK button 510 is a soft key for confirming an input URL character string. When the URL is confirmed, the web browser 4032 transmits an HTTP request for the input URL. The progress bar 508 shows the progress of response acquisition processing for the HTTP request. The content display area 503 is used for displaying the acquired HTTP response. The back button 504 is a soft key for displaying again a screen which has been displayed before a currently displayed screen in accordance with a web browser display history. The forward button 505 is a soft key for displaying again a screen which has been displayed after a currently displayed preceding screen in accordance with the screen display history. The reload button 507 is a soft key for performing again acquisition and display operations of a currently displayed screen. The stop button 506 is a soft key for interrupting the HTTP request which is in progress. The status notification area 511 is used for displaying messages from various functions of the printing apparatus. Even if the web browser screen 501 is being displayed, the status notification area 511 can display a message for attracting the attention of the user from a scanner, a printer, another function, or the like. Similarly, the status notification area 511 can also display a message from the web browser 4032. The web browser 4032 displays a URL character string as a link destination, the title character string of contents, a message instructed by a script, or the like.

<Document Management Table>

FIG. 6 shows an example of a table constituting the document management database 4015 for managing document data and document data information which are stored in the storage unit 1022 (the external storage device 211) of the document management application server 102 according to this embodiment. Each record of a document management table 601 corresponds to a document, and includes a document ID column 602, a document name column 603, a document management database item column 604, and a document data column 605. The document ID column 602 stores an identifier (for example, a number) for uniquely identifying document data saved in the storage unit 1022 (the external storage device 211) of the document management application server 102. The document name column 603 stores the name of the document data saved in the storage unit 1022 (the external storage device 211) of the document management application server 102. The document management database item column 604 stores an item value necessary for managing the document data other than the document ID column 602 and the document name column 603. The item value stored in the document management database item column 604 is different depending on embodiments of the document management application server 102, and any item value may be stored in the document management database item column 604 in this embodiment. That is, the document management database item column 604 need not be included, and a description thereof will be omitted. In this embodiment, pieces of information stored in the document ID column 602 and document name column 603 (and document management database item column 604, if any) are collectively represented as document data information. The document data information management unit 4014 of the document management application server 102 described above with reference to FIG. 4 executes processes associated with operations such as registration, search, and delete operations of the document ID column 602, document name column 603, and document management database item column 604 of the document management table 601. The document data column 605 stores the storage location information of the document data saved in the storage unit 1022 (the external storage device 211) of the document management application server 102 or the document data itself. In this embodiment, either of them may be an item value stored in the document data column 605.

<Procedure of Specifying Document to Be Printed>

Figure 7:
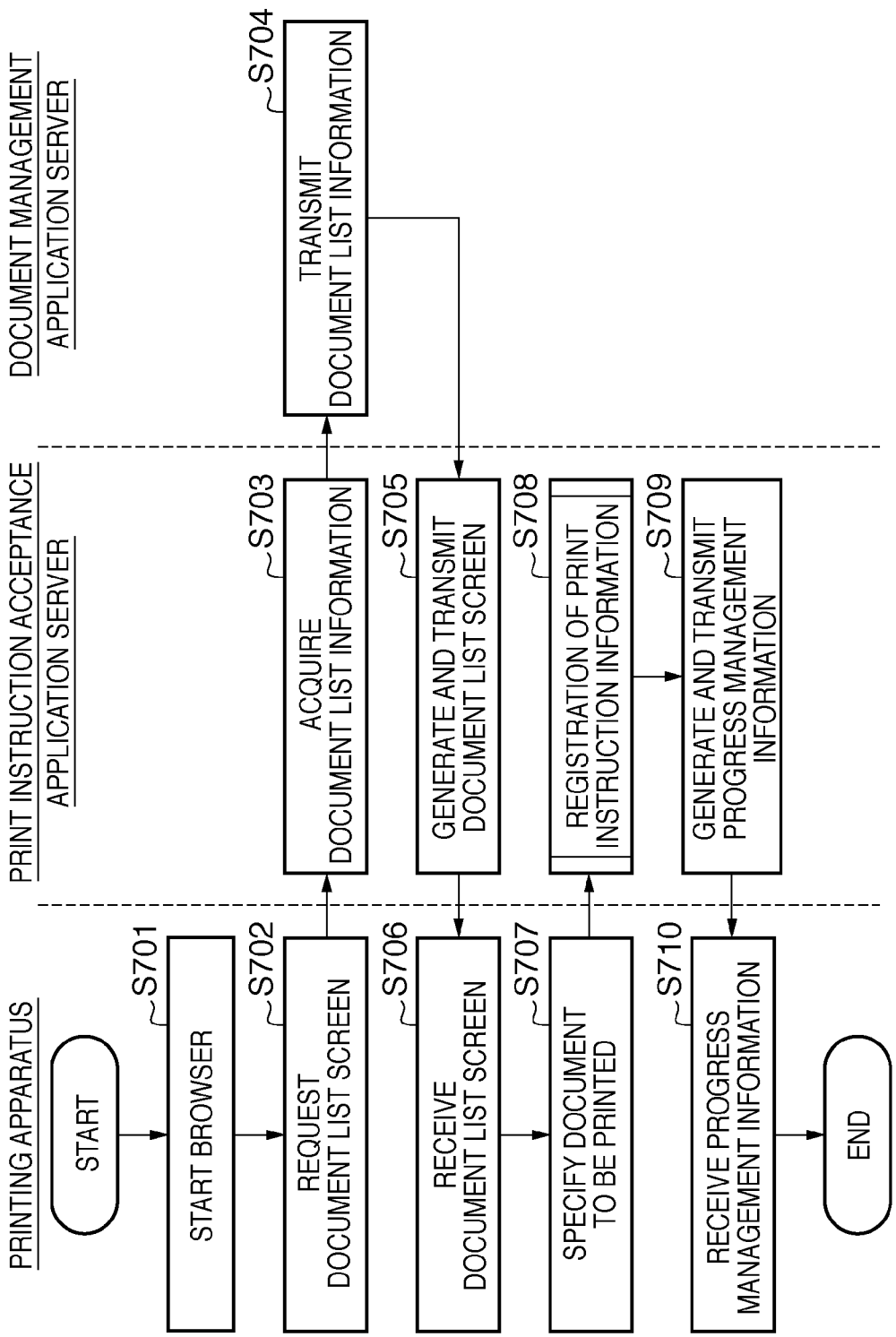
FIG. 7 is a flowchart for explaining processing until document data to be printed is selected in the first embodiment.

Processing in each step in the cloud printing system according to the first embodiment will be described in detail below with reference to FIGS. 7 to 13. FIG. 7 is a flowchart illustrating processing until a print instruction for document data stored in the document management application server 102 is sent to the print instruction acceptance application server 103 using the web browser 4032 of the printing apparatus 104 in the processing procedure of the cloud printing system according to this embodiment. Referring to FIG. 7, the left part shows a procedure executed by the printing apparatus 104, the middle part shows a procedure performed by the print instruction acceptance application server 103, and the right part shows a procedure executed by the document management application server 102.

In step S701, the printing apparatus 104 loads the web browser 4032 stored in the hard disk drive (HDD) 307 into the RAM 302. Upon completion of the load processing, the CPU 301 executes the web browser 4032 loaded into the RAM 302, and displays the web browser 4032 on the operation unit 1042.

In step S702, the web browser 4032 transmits an HTTP request to acquire the list information of document data managed by the document management application server 102 from the print instruction acceptance application server 103. The list information of the document data indicates the document data information of all document data stored in the storage unit 1022 (the external storage device 211) of the document management application server 102. In this case, any method for inputting the URL information of the print instruction acceptance application server 103 in the URL input field 509 of the web browser screen 501 is available. The URL information may be stored in the hard disk drive (HDD) 307 of the printing apparatus 104 in advance, and then set when the CPU 301 starts the web browser 4032 in step S701. Alternatively, the user using the web browser 4032 may manually set (input) the URL information.

In step S703, upon reception of the HTTP request from the web browser 4032, the web server unit 4021 of the print instruction acceptance application server 103 calls the application server unit 4022. The application server unit 4022 transmits a web service request from the web service requester unit 4025 to the web service provider unit 4011 of the document management application server 102 via the Internet 101 to acquire the list information of the document data managed by the document management application server 102.

In step S704, the web service provider unit 4011 of the document management application server 102 receives the web service request from the web service requester unit 4025 of the print instruction acceptance application server 103 via the Internet 101. The web service provider unit 4011 passes the received web service request to the web service response generation unit 4012. The web service response generation unit 4012 calls the document data information management unit 4014 as processing according to the web service request to acquire document data information stored in the document management table 601. The document data information acquired from the document management table 601 need not contain the document data itself. The web service provider unit 4011 transmits the document data information acquired by the web service response generation unit 4012 to the web service requester unit 4025 of the print instruction acceptance application server 103.

In step S705, the web service requester unit 4025 of the print instruction acceptance application server 103 acquires the document data information received from the web service provider unit 4011 of the document management application server 102. The application server unit 4022 of the print instruction acceptance application server 103 dynamically generates a document list screen 801 in an HTML format from the document data information received by the web service requester unit 4025, and returns the generated document list screen 801 to the web server unit 4021. The web server unit 4021 returns the document list screen 801 to the web browser 4032 of the printing apparatus 104.

In step S706, the printing apparatus 104 displays, on the web browser 4032, the document list screen 801 received as an HTTP response from the web server unit 4021 of the document management application server 102.

Figure 8:
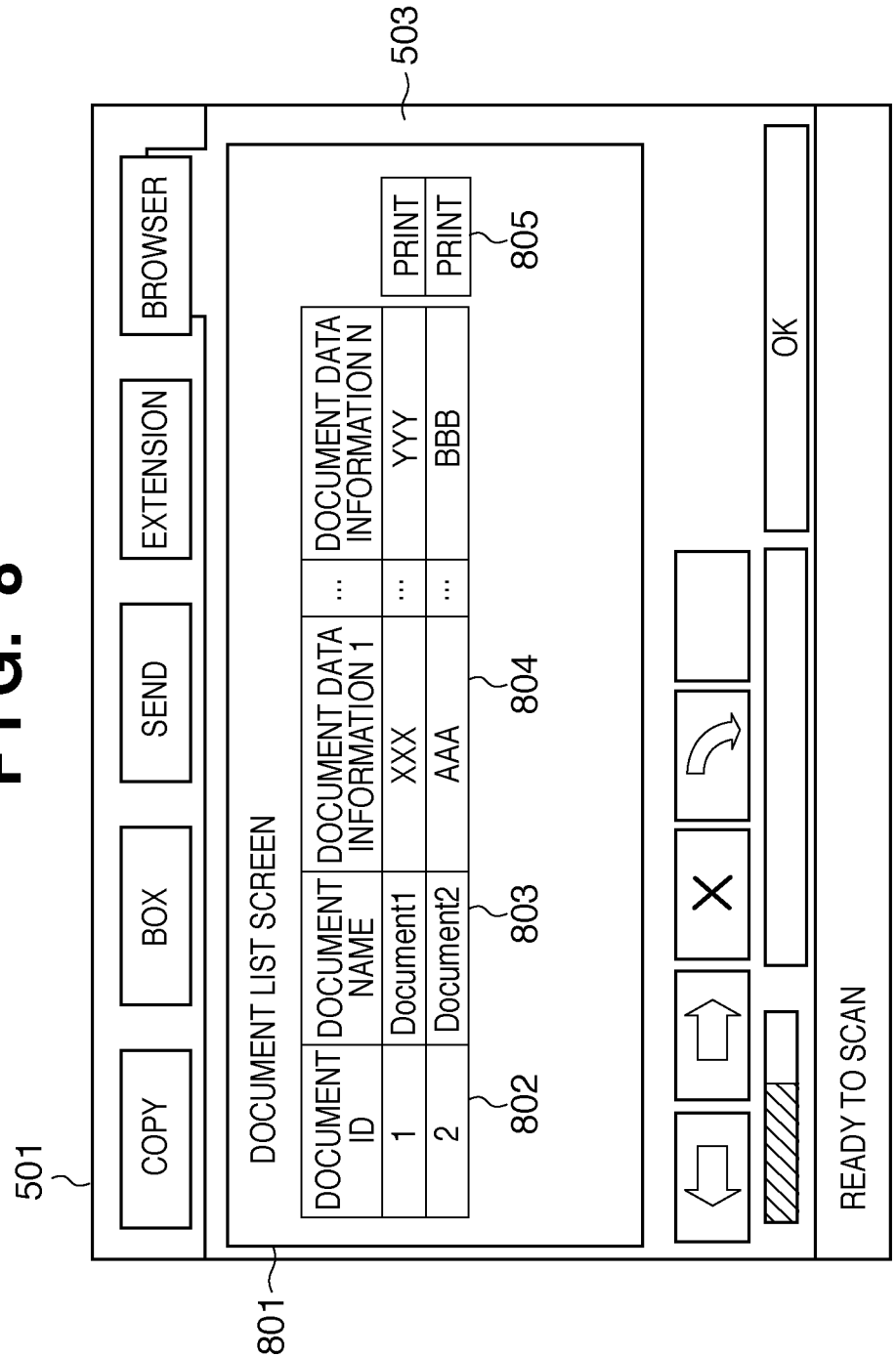
FIG. 8 is a view for explaining a document list screen displayed on the web browser 4032.

FIG. 8 shows an example of the document list screen displayed on the web browser 4032 according to this embodiment. The document list screen 801 includes document ID display areas 802, document name display areas 803, document data information display areas 804, and document print buttons 805. The components of the document list screen 801 are displayed in accordance with the number of pieces of document data information. The document ID display area 802 displays an item value stored in the document ID column 602 of the document management table 601. The document name display area 803 displays an item value stored in the document name column 603 of the document management table 601. The document data information display area 804 displays an item value stored in the document management database item column 604 of the document management table 601. The document print button 805 is used for sending, to the print instruction acceptance application server 103, a print instruction for a document with the identification information (ID) displayed in the document ID display area 802.

In step S707, the user specifies a document to be printed by pressing the print button 805 which is displayed on the document list screen 801 and corresponds to the document to be printed. Upon pressing of the print button 805, the web browser 4032 of the printing apparatus 104 transmits a print instruction HTTP request together with the item value displayed on the document ID display area 802 associated with the print button 805 to the web server unit 4021 of the print instruction acceptance application server 103 via the Internet 101. This HTTP request corresponds to a print instruction request, and also corresponds to a conversion request from document data into print data.

In step S708, the web server unit 4021 of the print instruction acceptance application server 103 receives the print instruction HTTP request from the web browser 4032 of the printing apparatus 104. Upon reception of the print instruction HTTP request, the web server unit 4021 calls the application server unit 4022. The application server unit 4022 calls the print instruction acceptance unit 4026 to register the received HTTP request in the data management unit 4023 as a preparation for execution of the print instruction.

Figure 9:
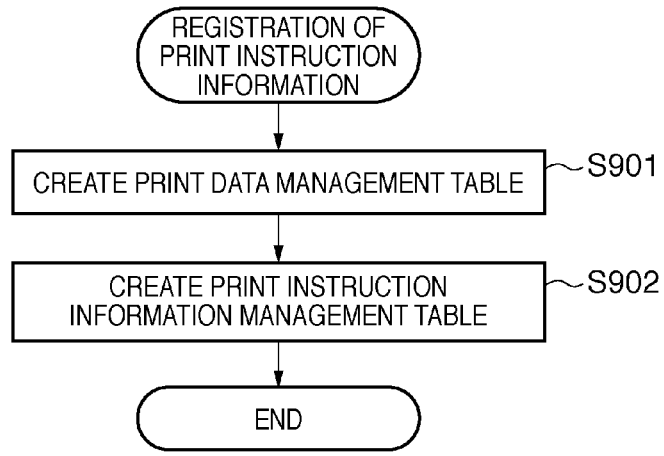
FIG. 9 is a flowchart for explaining details of print instruction registration in the flowchart illustrated in FIG. 7 in the first embodiment.
Figure 10:
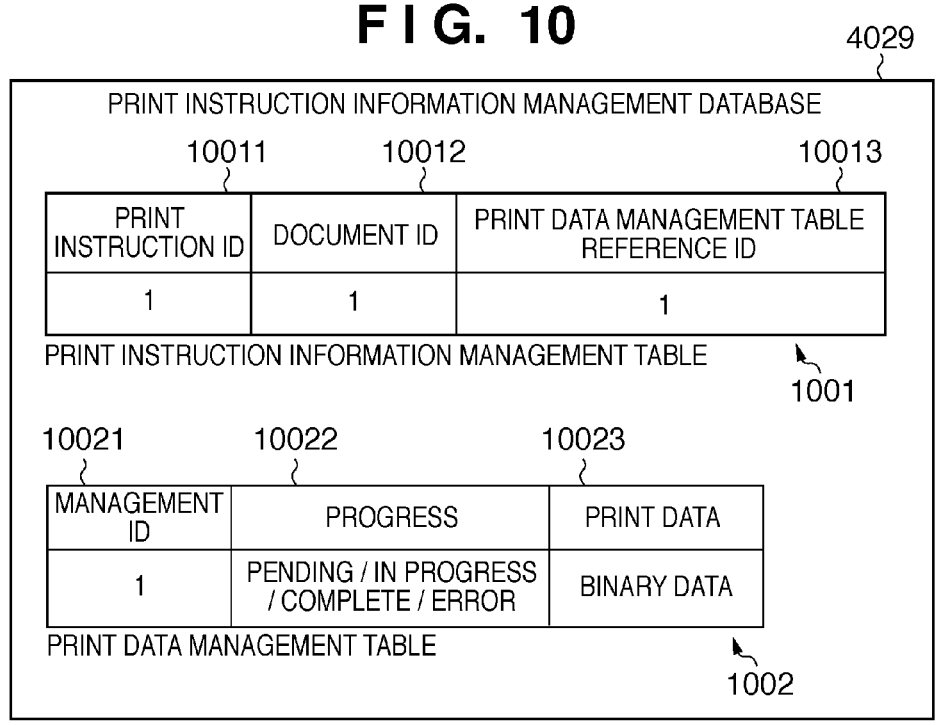
FIG. 10 is a view for explaining a print instruction information management database in the print instruction acceptance application server 103.

FIG. 9 is a flowchart illustrating details of processing (print instruction registration processing) of registering print instruction information, which is executed by the print instruction acceptance unit 4026 of the print instruction acceptance application server 103 in step S708 of FIG. 7. Before explaining the flowchart, a database to be used in the procedure shown in FIG. 9 will be described. FIG. 10 shows an example of tables constituting a print instruction information management database 4029 in which print instruction information is registered in the data management unit 4023 in the print instruction registration processing.

The print instruction information management database 4029 includes a print instruction information management table 1001 for managing print instruction information, and a print data management table 1002 for saving print data converted from document data in accordance with a print instruction. Each record of the print instruction information management table 1001 has a print instruction ID column 10011, a document ID column 10012, and a print data management table reference ID column 10013, and corresponds to one document. In each record, the print instruction ID column 10013 stores a unique identification number which is issued by the print instruction acceptance unit 4026 in accordance with the received print instruction HTTP request. The document ID column 10012 stores the item value displayed in the document ID display area 802 specified in step S707. The print data management table reference ID column 10013 stores a number (print data management table reference number), which is issued by the print instruction acceptance unit 4026 and uniquely identifies a record registered in the print data management table 1002.

Each record of the print data management table 1002 has a management ID column 10021, a progress column 10022, and a print data column 10023. The management ID column 10021 stores a unique identification number which is issued by the print instruction acceptance unit 4026 in response to the received print instruction HTTP request. The progress column 10022 stores an item value (that is, progress information) indicating the progress of conversion processing from document data into print data. The column 10022 stores a value indicating "pending" as an initial value when the print instruction acceptance unit 4026 creates a print data management table 1002. After that, the data conversion processing unit 4027 (to be described later) registers and updates a value indicating "in progress", "complete", "abnormal end", or the like in accordance with the processing state. The print data column 10023 stores print data after the conversion processing which is created by the data conversion processing unit 4027 (to be described later).

Referring back to FIG. 9, in step S901 the print instruction acceptance unit 4026 creates a record corresponding to the received print instruction HTTP request in the print data management table 1002 in the storage unit 1032 (the external storage device 211) of the print instruction acceptance application server 103. That is, the unit 4026 adds a new record in response to the print instruction HTTP request, and registers the initial value of each column of the new record. To do this, the unit 4026 creates a unique management ID and registers it in the management ID column 10021, and registers "pending" as an initial value in the progress column 10022. The unit 4026 reserves an extensible file area for storing print data, and registers the address of the file area in the print data column 10023. In this case, the file area for storing print data stores a null code as an initial value.

In step S902, the print instruction acceptance unit 4026 creates a print instruction information management table 1001 according to the received print instruction HTTP request in the storage unit 1032 (the external storage device 211) of the print instruction acceptance application server 103. That is, the unit 4026 adds a new record, and registers the initial value of each column of the new record. For example, the unit 4026 newly creates a print instruction ID and registers it in the print instruction ID column 10011, and registers the received document ID in the document ID column 10012 in correspondence with the newly created print instruction ID. The unit 4026 registers the reference ID of the new record of the print data management table 1002 created in step S901 in the reference ID column 10013 to associate the records of the tables 1001 and 1002 with each other. With this operation, information for specifying a document for which a print operation has been instructed is associated with the progress of conversion processing for the document and print data to be generated.

When the above procedure in step S708 is complete, in step S709 the print instruction acceptance unit 4026 returns the management ID column 10021 of the print data management table 1002 issued in step S708 to the application server unit 4022. Upon reception of the management ID column 10021, the application server unit 4022 dynamically generates data (HTML data) described by the HTML, which includes the management ID column 10021 and a script for starting the print instruction checking application 4033 of the printing apparatus 104. This HTML data includes, for example, as data for display, the ID of the specified document data, and a message indicating that the print instruction has been accepted. The unit 4022 returns the generated HTML data to the web server unit 4021. The HTML data is also referred to as progress management information. The web server unit 4021 returns the received HTML data to the web browser 4032 of the printing apparatus 104. The progress management information serves as a reception response to the conversion request. The document data ID contained in the progress management information specifies document data. This document data is also referred to as specific document data.

In step S710, the printing apparatus 104 displays, on the web browser 4032, the data (progress management information) for display, which has been received as an HTTP response from the web server unit 4021 of the print instruction acceptance application server 103.

<Conversion Processing from Document Data into Print Data>

Figure 11:
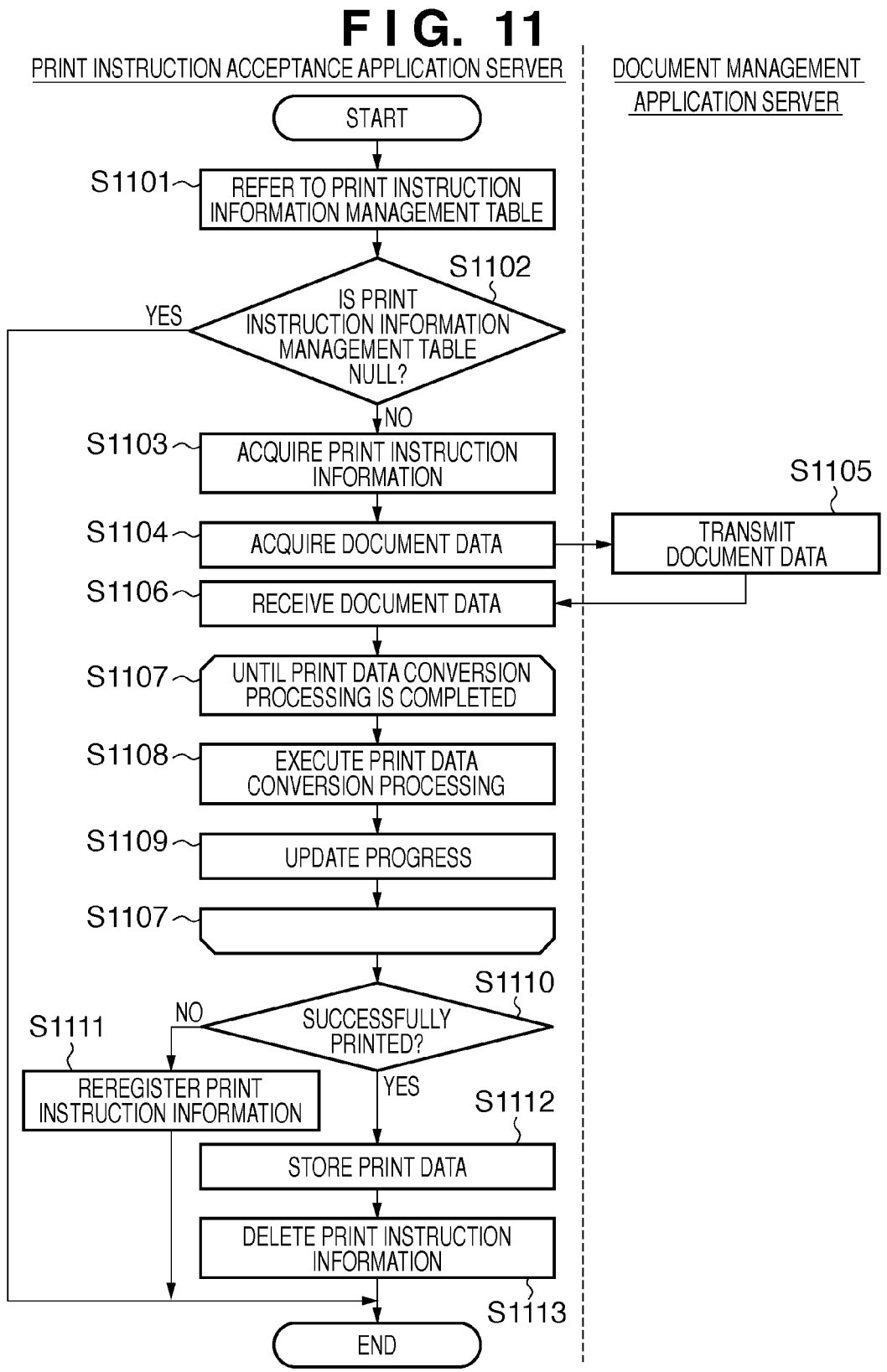
FIG. 11 is a flowchart for explaining processing until document data is converted into print data in the first embodiment.

FIG. 11 is a flowchart illustrating processing until the data conversion processing unit 4027 of the print instruction acceptance application server 103 converts document data corresponding to the document ID column 10012 of the print instruction information management table 1001 into print data. In this case, the print data has a format interpretable and printable by the printing apparatus 104 for printing a specified document. The processing of the flowchart shown in FIG. 11 can be executed asynchronously in parallel with the flowchart shown in FIG. 7. The print instruction information management table is referred to at regular intervals, and if, for example, an unprocessed record is registered, the procedure shown in FIG. 11 is performed. After the processing of FIG. 11 is completed, the print instruction information management table is referred to and the presence/absence of an unprocessed record is examined. If an unprocessed record is present, the processing of FIG. 11 may be executed.

In step S1101, the data conversion processing unit 4027 refers to print instruction information registered in the print instruction information management table 1001 of the print instruction information management database via the data management unit 4023.

In step S1102, the data conversion processing unit 4027 totalizes the number of pieces of print instruction information registered in the print instruction information management table 1001 which have been referred to via the data management unit 4023 in step S1101. If no print instruction information is registered, the process ends.

If print instruction information is determined to be registered in step S1102, in step S1103 the data conversion processing unit 4027 acquires a piece of print instruction information via the data management unit 4023, and temporarily stores it in the RAM 302 of the printing apparatus 104. At this time, the unit 4027 deletes the acquired print instruction information from the print instruction information management table 1001.

In step S1104, the data conversion processing unit 4027 calls the web service requester unit 4025 to acquire document data corresponding to the document ID column 10012 of the print instruction information stored in the RAM 302 from the document management application server 102. The web service requester unit 4025 transmits a web service request for acquiring document data managed by the document management application server 102 to the web service provider unit 4011 of the document management application server 102.

In step S1105, the web service provider unit 4011 of the document management application server 102 receives the web service request from the web service requester unit 4025 of the print instruction acceptance application server 103. The web service provider unit 4011 passes the received web service request to the web service response generation unit 4012. The web service response generation unit 4012 calls the document data management unit 4013 to acquire document data corresponding to the document ID contained in the received web service request from the document management table 601 as processing according to the web service request. The web service provider unit 4011 transmits the document data acquired by the web service response generation unit 4012 to the web service requester unit 4025 of the print instruction acceptance application server 103.

In step S1106, the web service requester unit 4025 of the print instruction acceptance application server 103 receives the document data information from the web service provider unit 4011 of the document management application server 102, and passes it to the data conversion processing unit 4027.

In steps S1107 to S1109, the data conversion processing unit 4027 converts the document data received in step S1106 into print data. Steps S1108 and S1109 are repeated until conversion processing is completed. In step S1107, the data conversion processing unit 4027 starts the conversion processing of the document data received in step S1106 into print data. In step S1108, the data conversion processing unit 4027 executes the conversion processing of the document data into print data. Upon start of the print data conversion processing in step S1107, the data conversion processing unit 4027 changes the value of the corresponding progress column 10022 of the print data management table 1002 through the data management unit 4023 in step S1109. In step S1109, the unit 4027 updates the value of the progress column 10022 with "in progress" if the conversion processing is in progress, "complete" if the data conversion processing is successfully completed, and "error" if an error or the like occurs and the processing is aborted. The processing in step S1108 may be performed on a regular basis, or may be executed for each processing unit of the conversion processing. If the unit 4027 updates the value of the progress column 10022 with "complete" or "error" in step S1109, the data conversion processing ends and the process advances to step S1110.

In step S1110, the data conversion processing unit 4027 refers to the value of the corresponding progress column 10022 of the print data management table 1002 via the data management unit 4023 to determine its contents. If the value of the progress column 10022 is "error", in step S1111 the unit 4027 reregisters, in the print instruction information management table 1001, the print instruction information stored in the RAM 302.

If the value of the progress column 10022 is "complete", in step S1112 the data conversion processing unit 4027 stores, in the print data column 10023 of the print data management table 1002 via the data management unit 4023, the print data for which the data conversion processing is complete.

In step S1113, the data conversion processing unit 4027 deletes the print instruction information stored in the RAM 302 to terminate the process.

<Acquisition and Print Processing of Print Data Executed by Printing Apparatus>

Figure 12:
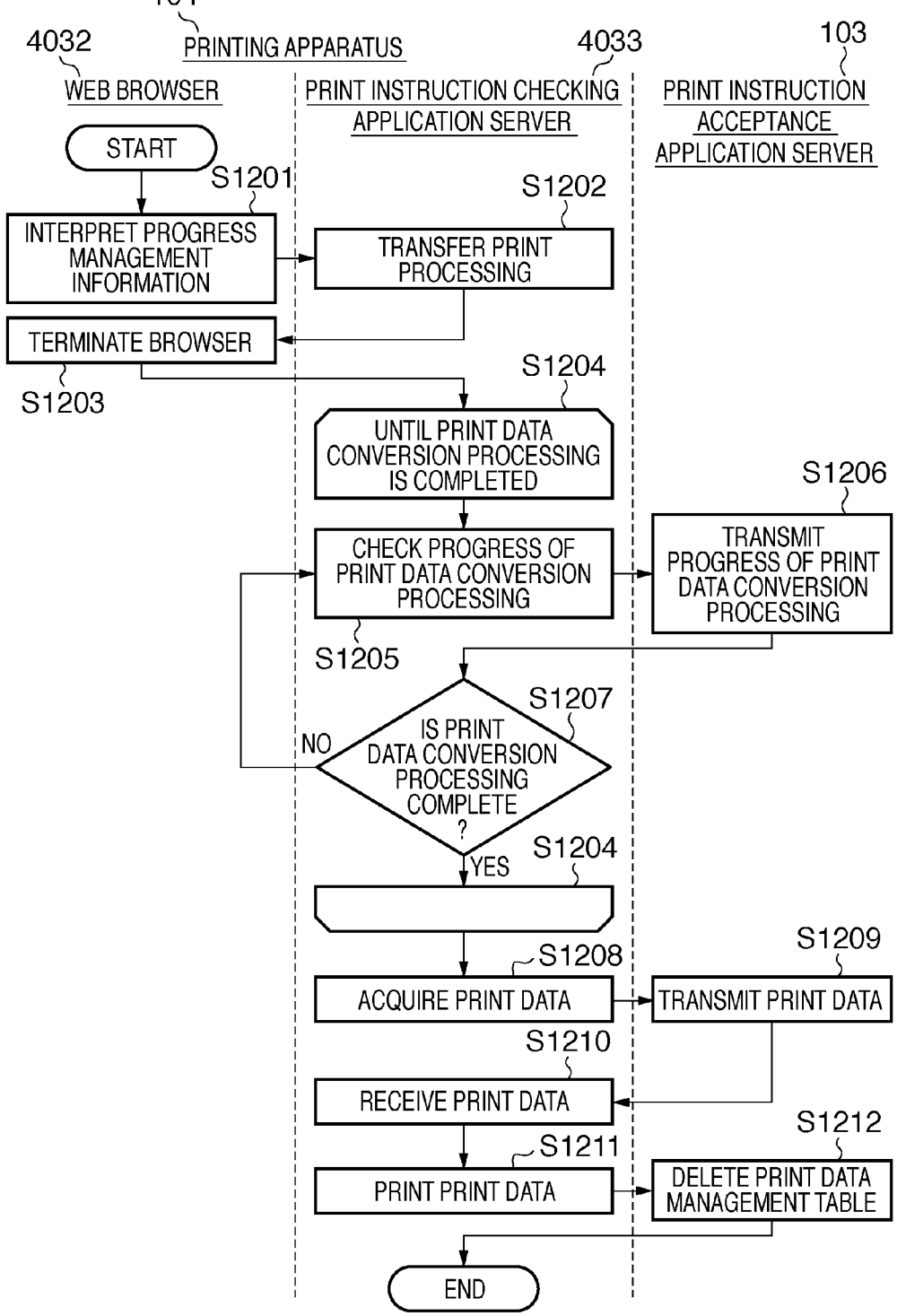
FIG. 12 is a flowchart for explaining processing until the printing apparatus 104 prints print data in the first embodiment.

FIG. 12 is a flowchart illustrating processing until the printing apparatus 104 which has received the print data management table management data in step S710 of FIG. 7 acquires print data from the print instruction acceptance application server 103, and executes print processing.

In step S1201, upon display of the HTTP response received in step S710 on a screen, the web browser 4032 of the printing apparatus 104 executes a start script for the print instruction checking application 4033 contained in the received HTML data. With this operation, the print instruction checking application 4033 serving as a process independent of the web browser starts.

Figure 13:
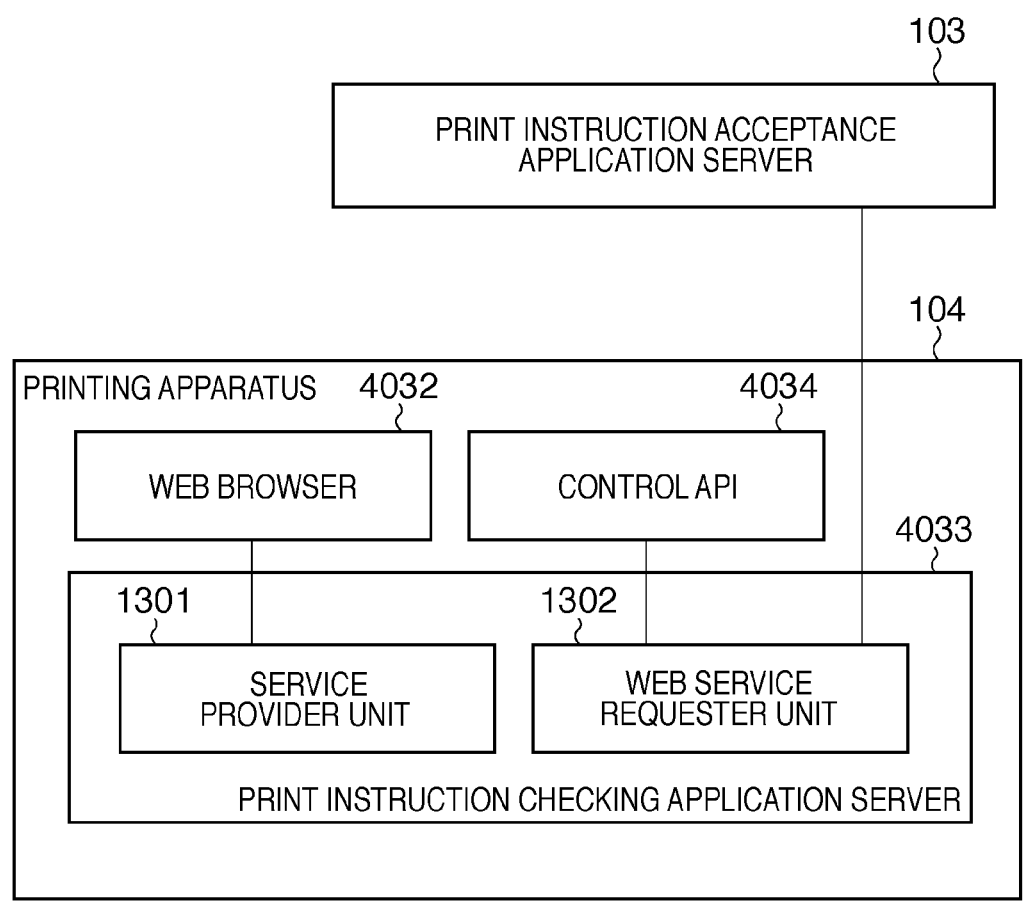
FIG. 13 is a block diagram showing the software configuration of a print instruction checking application 4033.

FIG. 13 shows the internal software configuration of the print instruction checking application 4033 constituting the printing apparatus 104 in the cloud printing system according to this embodiment. The print instruction checking application 4033 has a web service provider unit 1301 and a web service requester unit 1302 inside. The start script of the print instruction checking application 4033 transmits a service request for starting the print instruction checking application 4033 to the web service provider unit 1301 of the print instruction checking application 4033. When transmitting the service request, the start script also transmits the management ID column 10021 of the print data management table 1002 received as an HTTP response.

When the print instruction checking application 4033 successfully starts in step S1201, it temporarily stores the received management ID column 10021 of the print data management table 1002 in the RAM 302 in step S1202. With this operation, print data specified by the management ID is generated, and management until the print data is printed is transferred to the print instruction checking application 4033. That is, the print processing is transferred to the print instruction checking application 4033.

Upon completion of storage of the management ID column 10021 in step S1202, the web browser 4032 terminates Internet connection with the print instruction acceptance application server 103 in step S1203. The user who uses the web browser 4032 of the printing apparatus 104 at this time does not operate the printing apparatus 104 until print processing for the print data is completed in step S1210 (to be described later). It is possible to additionally transmit a document data print instruction to the print instruction acceptance application server 103 in accordance with the flowchart shown in FIG. 7 regardless of whether the print processing for the print data is complete.

In step S1204, the print instruction checking application 4033 communicates with the print instruction acceptance application server 103, and repeats processes in steps S1205 to S1207 until the print data conversion processing shown in FIG. 11 is completed.

In step S1205, the print instruction checking application 4033 transmits a progress information request from the web service requester unit 1302 to the web service provider unit 4024 of the print instruction acceptance application server 103. The progress information request is a web service request, which is received as progress management information and contains the management ID stored in the RAM 302, for acquiring the value of the progress column 10022 from a record of the print instruction information management database specified by the management ID.

In step S1206, the web service provider unit 4024 of the print instruction acceptance application server 103 receives the web service request (progress information request) from the print instruction checking application 4033. The web service provider unit 4024 calls the processing state response unit 4028 as processing according to the web service request. The processing state response unit 4028 acquires the value of the progress column 10022 corresponding to the management ID contained in the web service request from the print data management table 1002. The unit 4028 then transmits the acquired value as a response to the web service requester unit 1302 of the print instruction checking application 4033.

In step S1207, the print instruction checking application 4033 checks the value of the progress column received from the processing state response unit 4028 of the print instruction acceptance application server 103. If the value of the progress column is "complete", the process advances to step S1208 to start to acquire print data. If the value of the progress column is "in progress" or "pending", the processes in steps S1205 to S1207 are repeated until "complete" is acquired.

In step S1208, the print instruction checking application 4033 transmits, from the web service requester unit 1302 to the web service provider unit 4024, a web service request for acquiring, from the print data column 10023, print data corresponding to the management ID of a print job for which the progress column is determined to be "complete" in step S1207.

In step S1209, the web service provider unit 4024 of the print instruction acceptance application server 103 receives the web service request from the print instruction checking application 4033 via the Internet 101. The web service provider unit 4024 calls the processing state response unit 4028 as processing according to the web service request. From the print data management table of the print instruction information management database, the processing state response unit 4028 acquires print data which is stored in the print data column 10023 and corresponds to the management ID contained in the web service request. The unit 4028 then transmits the acquired data as a response to the web service requester unit 1302 of the print instruction checking application 4033.

In step S1210, the print instruction checking application 4033 acquires the print data received from the processing state response unit 4028 of the print instruction acceptance application server 103.

In step S1211, the print instruction checking application 4033 internally calls the control API 4034 from the web service requester unit 1302 to register the print data acquired in step S1210 in the job manager 4035 and start print processing. Upon completion of the print processing, the print instruction checking application 4033 transmits, to the print instruction acceptance application server 103, a web service request for deleting the record having the management ID of the complete print job from the print data management table 1002. The processing for the print job ends.

As described above, the print instruction checking application 4033 checks the progress of the conversion processing, that is, acquires the progress column, and then performs processing according to its contents.

In this embodiment, the web browser 4032 of the printing apparatus 104 transfers, to the print instruction checking application 4033 as another process, an operation of checking the response to the request for executing the conversion processing from the document data transmitted to the print instruction acceptance application server 103 into print data. Transferring an operation of checking the response to the processing request transmitted by the web browser 4032 and the subsequent processing to a software process different from the web browser makes it possible to terminate connection between the browser associated with the processing request and the server. This allows the printing apparatus 104 to parallely receive services from a plurality of different web application servers.

[Second Embodiment]

In the first embodiment, a case in which the print instruction acceptance application server 103 acquires document data from the document management application server 102 and performs conversion processing of the document data into print data every time it receives a print instruction from the web browser 4032 of the printing apparatus 104 has been explained. In the first embodiment, the printing apparatus 104 executes print processing for the print data converted from the document data, and then the print data management table 1002 itself is deleted from the storage unit 1032 of the print instruction acceptance application server 103.

In the second embodiment, the following case will be described. That is, assume that a printing apparatus 104 executes print processing for print data converted by a data conversion processing unit 4027 of a print instruction acceptance application server 103. Even in that case, storing the converted print data in a storage unit 1032 of the print instruction acceptance application server 103 shortens a time taken for print data conversion processing, thereby reducing the total time from when the printing apparatus 104 sends a print instruction until print processing is completed.

In this embodiment, a procedure until a web browser 4032 of the printing apparatus 104 sends a print instruction for document data stored in the document management application server 102 to the print instruction acceptance application server 103 is the same as that in the first embodiment. That is, the procedure described with reference to FIGS. 7 to 10 in the first embodiment is also performed in the second embodiment, and a description thereof will be omitted.

A procedure until the data conversion processing unit 4027 of the print instruction acceptance application server 103 converts the document data into a data format interpretable and printable by the printing apparatus 104 is the same as that described with reference to FIG. 11 in the first embodiment, and a description thereof will be omitted.

Figure 14:
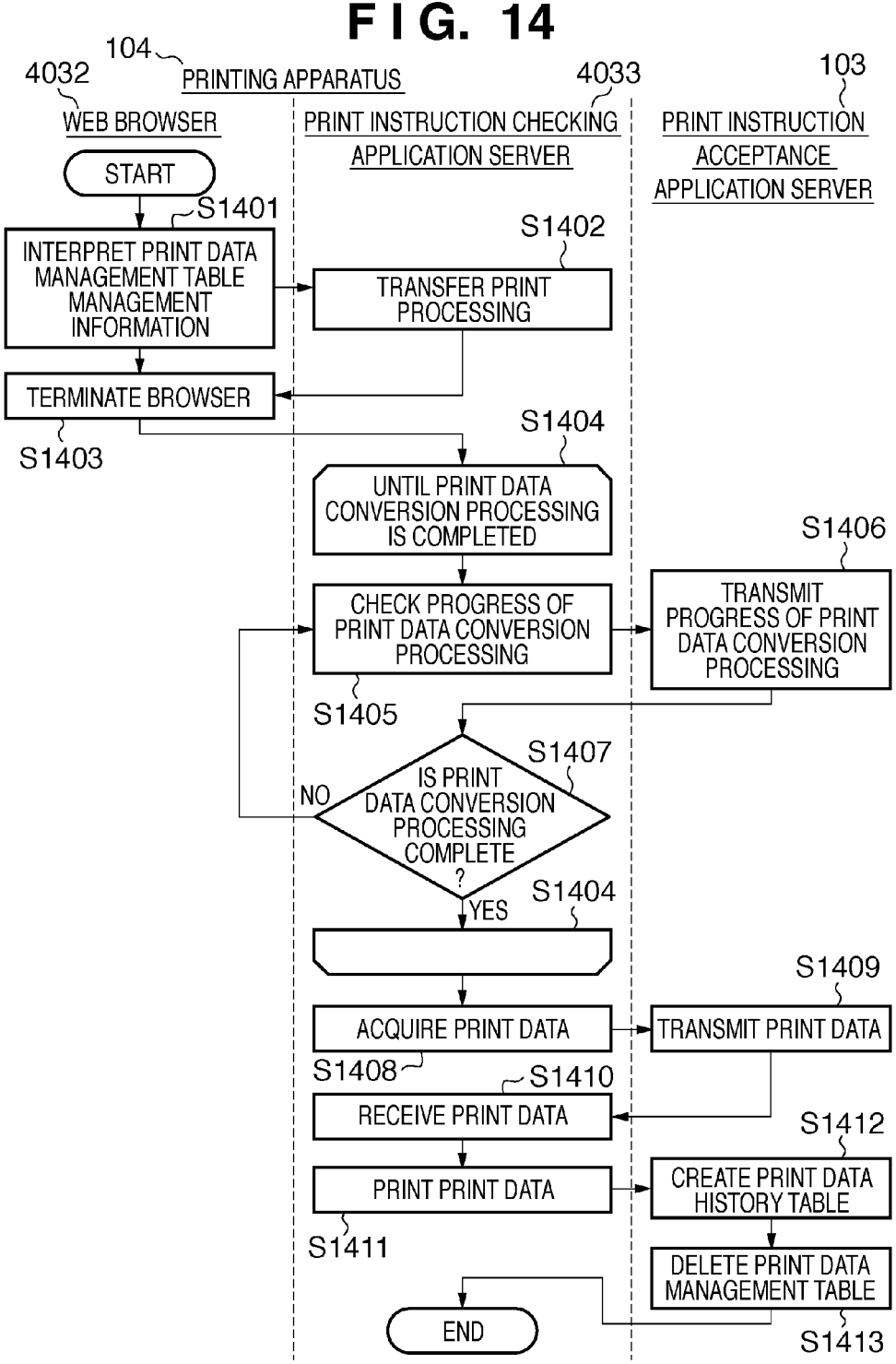
FIG. 14 is a flowchart for explaining processing until a printing apparatus 104 prints print data in the second embodiment.

FIG. 14 is a flowchart illustrating processing until the printing apparatus 104 acquires print data from the print instruction acceptance application server 103, and performs print processing. A different point from FIG. 12 in the first embodiment is that the printing apparatus 104 stores the print data in the print instruction acceptance application server 103 even after it completes the print processing.

Processes in steps S1401 to S1411 are the same as those in steps S1201 to S1211 in FIG. 12, and a description thereof will be omitted.

In step S1411, a print instruction checking application 4033 completes the print processing in the printing apparatus 104. The application 4033 transmits, from a web service requester unit 1302 to a web service provider unit 4024 of the print instruction acceptance application server 103, a web service request for deleting a record corresponding to the management ID of the complete print job from a print data management table. Upon reception of the web service request, the web service provider unit 4024 of the print instruction acceptance application server 103 calls a processing state response unit 4028. The processing state response unit 4028 copies, via a data management unit 4023, the print data which has been transmitted to the printing apparatus 104 in step S1409 and a document ID associated with the print data, from a print data management table 1002 and a print instruction information management table 1001 to a print data history table.

FIG. 15 shows a print data history table as a copy destination of the value of a document ID column 10012 of the print instruction information management table 1001 and the data of a print data column 10023 of the print data management table 1002 in step S1412. A print data history table 1501 is used for managing the history of print data converted by the data conversion processing unit 4027 of the print instruction acceptance application server 103. The print data history table 1501 includes a history ID column 15011, a document ID column 15012, a print data column 15013, a printing apparatus information column 15014, and a storage location information column 15015. The history ID column 15011 stores a number for uniquely identifying history data, which is issued by the processing state response unit 4028. The document ID column 15012 stores the item value of a document ID for identifying document data before conversion into the print data which has been transmitted to the printing apparatus in step S1409. The document ID is obtained by copying the value of the document ID column 10012 of the print instruction information management table 1001. The print data column 15013 stores the print data which has been transmitted to the printing apparatus in step S1409. The print data is obtained by copying the data of the print data column 10023 of the print data management table 1002. Note that the printing apparatus information column 15014 and storage location information column 15015 are not used in this embodiment, and a description thereof will be omitted. The printing apparatus information column 15014 and storage location information column 15015 will be explained in the third embodiment (to be described later).

In step S1413, the processing state response unit 4028 deletes, from a print instruction information management database, the print instruction information management table 1001 and print data management table 1002 associated with the print data which has been transmitted to the printing apparatus 104 in step S1409.

FIG. 16 is a flowchart illustrating processing until a print instruction of the same document data as that specified in step S707 is sent to the print instruction acceptance application server 103 in step S1607 in this embodiment.

Processes in steps S1601 to S1607 are the same as those in steps S701 to S707 in FIG. 7, and a description thereof will be omitted.

In step S1608, a web server unit 4021 of the print instruction acceptance application server 103 receives a print instruction HTTP request containing the document ID of document data to be printed from the web browser 4032 of the printing apparatus 104. Upon reception of the print instruction HTTP request, the web server unit 4021 calls an application server unit 4022. The application server unit 4022 calls the data management unit 4023 to check whether the document ID received with the HTTP request is registered in the print data history table 1501. If the corresponding document ID is not registered in the print data history table 1501, the process advances to step S1612 to register the received HTTP request in the data management unit 4023 as a preparation for execution of the print instruction. Processes in steps S1612 to S1614 are the same as those in steps S708 to S710, and a description thereof will be omitted.

If it is determined in step S1608 that the corresponding document ID is registered in the print data history table 1501, the process advances to step S1609. In step S1609, the application server unit 4022 checks via the data management unit 4023 whether print data is stored in the print data column 15013 of the print data history table 1501, which corresponds to the document ID determined in step S1608. If print data is not stored, the process advances to step S1612; otherwise, the process advances to step S1610.

In step S1610, the application server unit 4022 receives, via the data management unit 4023, the value of the history ID column 15011 of the print data history table 1501, which corresponds to the document ID determined in step S1608, and dynamically generates an HTML screen including the history ID column 15011 and a script for starting the print instruction checking application 4033 of the printing apparatus 104. The unit 4022 then returns the generated HTML screen to the web server unit 4021. The web server unit 4021 returns the HTML screen to the web browser 4032 of the printing apparatus 104.

In step S1611, the printing apparatus 104 displays the screen received as an HTTP response from the web server unit 4021 of the print instruction acceptance application server 103 on the web browser 4032.

FIG. 17 is a flowchart illustrating processing until the web browser 4032 of the printing apparatus 104 sends a print instruction of the document data specified by the procedure of FIG. 7 to the print instruction acceptance application server 103, and the printing apparatus 104 acquires print data from the print instruction acceptance application server and executes print processing.

In step S1701, the printing apparatus 104 analyzes the information which has been received as an HTTP response from the web server unit 4021 of the print instruction acceptance application server 103 in step S1611. The web browser 4032 analyzes the script included in the received HTML screen, and checks whether information contained in the script is the management information of the print data management table. If the contained information is the management information of the print data management table, the process advances to step S1708. Note that a process in step S1708 is the same as the procedure described with reference to FIG. 12, and a description thereof will be omitted.

If it is determined in step S1701 that the contained information is not the management information of the print data management table, the process advances to step S1702 and the web browser 4032 checks whether the information is a history ID. If the information is not a history ID, the process ends.

If it is determined in step S1702 that the contained information is a history ID, the process advances to step S1703. In step S1703, the web browser 4032 of the printing apparatus 104 executes the start script of the print instruction checking application 4033 included in the screen when it displays, on the screen, the HTTP response which has been received in step S1611. The start script of the print instruction checking application 4033 transmits a service request for starting the print instruction checking application 4033 to a web service provider unit 1301 of the print instruction checking application 4033. When transmitting the service request, the start script also transmits the history ID column 15011 of the print data history table 1501 received with the HTTP response.

When the print instruction checking application 4033 successfully starts in step S1703, it temporarily stores the received history ID column 15011 of the print data history table 1501 in a RAM 302 in step S1704. Upon completion of storage of the history ID column 15011, the web browser 4032 terminates Internet connection with the print instruction acceptance application server 103. The user who uses the web browser 4032 of the printing apparatus 104 at this time does not operate the printing apparatus 104 until print processing for the print data is completed in step S1707 (to be described later). As in the first embodiment, it is possible to additionally transmit a document data print instruction to the print instruction acceptance application server 103 in accordance with the flowchart shown in FIG. 7 regardless of whether the print processing for the print data is complete.

In step S1705, the print instruction checking application 4033 transmits a web service request for acquiring print data corresponding to the stored history ID to the print instruction acceptance application server 103. The print data column 15013 of a record of the print data history table corresponding to the history ID stores the print data corresponding to the history ID.

In step S1706, the web service provider unit 4024 of the print instruction acceptance application server 103 receives the web service request from the print instruction checking application 4033 via the Internet 101. The web service provider unit 4024 calls a processing state response unit 4028 as processing according to the web service request. The processing state response unit 4028 acquires the print data stored in the print data column 15013 corresponding to the history ID contained in the web service request from the print data history table of the print instruction information management database. Then, the unit 4028 transmits the acquired data as a response to the web service requester unit 1302 of the print instruction checking application 4033.

In step S1707, the print instruction checking application 4033 acquires the print data received from the processing state response unit 4028 of the print instruction acceptance application server 103. The print instruction checking application 4033 internally calls a control API 4034 from the web service requester unit 1302 to register the acquired print data in a job manager 4035 and execute print processing.

According to the second embodiment, storing, in the print data history table 1501, document data which has been converted into print data before shortens a time taken for print data conversion processing, thereby reducing the total time from when the printing apparatus 104 sends a print instruction until print processing is completed.

[Third Embodiment]

In the second embodiment, a case in which even after the print processing is executed for the print data converted by the data conversion processing unit 4027 of the print instruction acceptance application server 103, the print data is stored in the storage unit 1032 of the print instruction acceptance application server 103 has been explained. In the third embodiment, print data converted by a data conversion processing unit 4027 of a print instruction acceptance application server 103 is stored in a hard disk drive (HDD) 307 of a printing apparatus 104. With this operation, print processing is completed without connecting to the Internet 101 except when the printing apparatus 104 sends a print instruction.

In this embodiment, a procedure until a print instruction for document data stored in a document management application server 102 is sent to the print instruction acceptance application server 103 using a web browser 4032 of the printing apparatus 104 is the same as that described with reference to FIGS. 7 to 10 in the first embodiment, and a description thereof will be omitted.

Furthermore, a procedure until the data conversion processing unit 4027 of the print instruction acceptance application server 103 converts document data corresponding to an item value stored in a document ID column 10012 of a print instruction information management table 1001 into a data format interpretable and printable by the printing apparatus 104 is the same as that described with reference to FIG. 11 in the first embodiment, and a description thereof will be omitted.

FIG. 18 is a flowchart illustrating processing until the printing apparatus 104 acquires print data from the print instruction acceptance application server 103, and executes print processing in the processing procedure of a cloud printing system according to this embodiment. A different point from FIG. 12 in the first embodiment is that print data is stored in the printing apparatus 104 even after the printing apparatus 104 completes print processing.

Processes in steps S1801 to S1810 are the same as those in steps S1201 to S1210 in FIG. 12, and a description thereof will be omitted.

In step S1811, a control unit 1041 of the printing apparatus 104 stores print data received in step S1809 in the hard disk drive (HDD) 307.

In step S1812, a print instruction checking application 4033 transmits a web service request from a web service requester unit 1302 to a web service provider unit 4024 of the print instruction acceptance application server 103. This request is sent to request to register, in a print data history table 1501, information about the storage location of the hard disk drive (HDD) 307 where the print data is stored in step S1811. The print instruction checking application 4033 acquires a printing apparatus information management unit 4039 to acquire, as printing apparatus identification information, information for uniquely identifying the printing apparatus in the system, such as a printing apparatus name or IP address, and to include the acquired information in the web service request.

Upon reception of the web service request, the web service provider unit 4024 of the print instruction acceptance application server 103 calls a processing state response unit 4028 in step S1813. The processing state response unit 4028 stores, in the print data history table 1501 of a print instruction information management database via a data management unit 4023, a document ID associated with the print data which has been transmitted to the printing apparatus 104 in step S1809, and the received storage location information and printing apparatus identification information.

The printing apparatus identification information is stored in a printing apparatus information column 15014 of the print data history table 1501. The storage location information is stored in a storage location information column 15015 of the print data history table 1501.

In step S1814, the processing state response unit 4028 deletes, from the print instruction information management database, the print instruction information management table 1001 and a print data management table 1002 associated with the print data which has been transmitted to the printing apparatus 104 in step S1809.

In step S1815, the print instruction checking application 4033 executes print processing in the printing apparatus 104.

FIG. 19 is a flowchart illustrating processing until a print instruction for the same document data as that specified in step S707 is transmitted to the print instruction acceptance application server 103 in step S1907 in this embodiment.

Processes in steps S1901 to S1907 are the same as those in steps S701 to S707 in FIG. 7, and a description thereof will be omitted.

Processes in steps S1908, S1912, S1913, and S1914 are the same as those in steps S1608, S1612, S1613, and S1614 in FIG. 16, and a description thereof will be omitted.

If it is determined in step S1908 that a corresponding document ID is registered in the print data history table 1501, the process advances to step S1909. In step S1909, an application server unit 4022 checks via the data management unit 4023 whether a value stored in the printing apparatus information column 15014 of the print data history table 1501, which corresponds to the document ID determined in step S1908, indicates a printing apparatus which has transmitted an HTTP request. If the value does not indicate the printing apparatus, the process advances to step S1912; otherwise, the process advances to step S1910.

In step S1910, the application server unit 4022 receives, via the data management unit 4023, the value of the storage location information column 15015 of the print data history table 1501, which corresponds to the document ID determined in step S1908. The unit 4022 then dynamically generates an HTML screen including the storage location information column 15015 and a script for starting the print instruction checking application 4033 of the printing apparatus 104, and returns the generated HTML screen to a web server unit 4021. The web server unit 4021 returns the HTML screen to the web browser 4032 of the printing apparatus 104.

In step S1911, the printing apparatus 104 displays the screen received as an HTTP response from the web server unit 4021 of the print instruction acceptance application server 103 on the web browser 4032.

FIG. 20 is a flowchart illustrating processing until the web browser 4032 of the printing apparatus 104 sends a print instruction for arbitrary document data to the print instruction acceptance application server 103 in FIG. 7, and then the printing apparatus 104 acquires print data from the print instruction acceptance application server, and executes print processing, in the processing procedure of the cloud printing system according to this embodiment.

In step S2001, the printing apparatus 104 analyzes the information which has been received as an HTTP response from the web server unit 4021 of the print instruction acceptance application server 103 in step S1911. The web browser 4032 analyzes the script included in the received HTML screen, and checks whether information contained in the script is the management information of the print data management table. If the contained information is the management information of the print data management table, the process advances to step S2007. Note that a process in step S2007 is the same as the procedure described with reference to FIG. 12, and a description thereof will be omitted.

If it is determined in step S2001 that the contained information is not the management information of the print data management table, the process advances to step S2002 and the web browser 4032 checks whether the information is the storage location information of the print data. If the information is not the storage location information of the print data, the process ends.

If it is determined in step S2002 that the contained information is the storage location information of the print data, the process advances to step S2003. In step S2003, the web browser 4032 of the printing apparatus 104 executes the start script of the print instruction checking application 4033 included in the screen when it displays, on the screen, the HTTP response which has been received from the web server unit 4021 of the print instruction acceptance application server 103 in step S1911.

When the print instruction checking application successfully starts in step S2003, it temporarily stores the received storage location information column 15015 of the print data history table 1501 in a RAM 302 in step S2004. Upon completion of storage of the storage location information column 15015, the web browser 4032 terminates Internet connection with the print instruction acceptance application server 103. The user who uses the web browser 4032 of the printing apparatus 104 at this time does not operate the printing apparatus 104 until print processing for the print data is completed in step S2006 (to be described later). As in the first embodiment, it is possible to additionally transmit a document data print instruction to the print instruction acceptance application server 103 in accordance with the flowchart shown in FIG. 7 regardless of whether the print processing for the print data is complete.

In step S2005, the print instruction checking application 4033 acquires the print data stored in the hard disk drive (HDD) 307 via a data management unit 4038 in accordance with the storage location information column 15015 of the print data stored in the RAM 302.

In step S2006, the print instruction checking application 4033 internally calls a control API 4034 from the web service requester unit 1302 to register the print data acquired in step S2005 in a job manager 4035 and execute print processing.

According to the third embodiment, by storing, in the printing apparatus 104, document data which has been converted into print data before, and storing the storage location of the print data in the print data history table 1501, a time taken for print data conversion processing is shortened, thereby reducing the total time from when the printing apparatus 104 sends a print instruction until print processing is completed. Furthermore, if the print instruction acceptance application server 103 manages the storage location of the print data, a user operation procedure in this system does not change regardless of whether the print data is stored in the printing apparatus 104. In the first to third embodiments, the web browser of the printing apparatus transfers the print processing to the print instruction checking application of the printing apparatus. However, the web browser of the PC of the user using the system according to the embodiments may send a print instruction to a server side, and then transfer the print processing to the print instruction application of the printing apparatus. In this case, a mechanism of specifying a local printing apparatus, and transferring processing to the specified printing apparatus is provided as plug-in software of the web browser of the PC or the like. The plug-in software of the web browser may pass, to the print instruction application of the printing apparatus, an identifier (such as a print job ID, a document ID, or a GUID issued by the server) for exchanging print data with the server.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298833, filed Dec. 28, 2009, which is hereby incorporated by reference herein in its entirety.

The invention claimed is:

1. A client terminal communicating with a document management server and a print server, wherein the document management server stores document data and the print server obtains the document data and converts it into print data, the client terminal comprising:

a web browser unit configured to interpret HTML (HyperText Markup Language) data to display information, wherein the web browser unit displays a list of documents stored in the document management server and transmits a conversion request to the print server for a document that is selected from among the documents in the list; and a print confirmation unit configured to confirm a progress of print conversion processing for the selected document to the print server in place of the web browser unit, wherein the print confirmation unit is independent of the web browser, and wherein the print confirmation unit acquires print data converted from the document in accordance with receiving a response from the print server indicating completion of conversion processing, and the process of checking a progress of print conversion processing is finished, wherein the web browser unit is further configured to instruct the print confirmation unit to initiate processing of confirming a progress of the print conversion processing for the selected document to the print server after the transmission of the conversion request, and disconnect the web browser unit from the print server, wherein the web browser unit analyzes a script contained in the HTML data, activates the print confirmation unit according to a result of the analysis of the script, provides instructions to the print confirmation unit for making the print confirmation unit confirm the progress of print conversion processing for the document to the print server, and if information indicating a storage location of the print data which was printed and stored by the client terminal is contained in the script, temporally stores the location information, and wherein the print confirmation unit activated by the web browser unit refers to the location information which is temporally stored to acquire the print data without connecting to the print server if the location information is temporally stored.

2. The client terminal according to claim 1, wherein the web browser unit transmits a print request for the selected document data after instructing the print confirmation unit to initiate processing of confirming a progress of the print conversion processing for the selected document to the print server even if printing of the print data is not complete.

3. The client terminal according to claim 1, wherein, when the print confirmation unit is instructed to initiate processing of confirming a progress of the print conversion processing for the selected document to the print server, the print confirmation unit acquires the document data without confirming a progress of the print conversion processing to the print server if it is determined that the selected document has been printed previously.

4. A managing method executed by a client terminal communicating with a document management server and a print server, wherein the document management server stores document data and the print server obtains the document data and converts it into print data, the method comprising:

by a web browser unit, interpreting HTML (HyperText Markup Language) data to display information, wherein the web browser displays a list of documents stored in the document management server and transmits a conversion request to the print server for a document which is selected from among the documents in the list; and by a print confirmation unit, confirming a progress of print conversion processing for the selected document to the print server in place of the web browser unit, wherein the print confirmation unit is independent of the web browser, wherein the print confirmation unit acquires print data converted from the document in accordance with receiving a response from the print server indicating completion of conversion, and the process of checking a progress of print conversion processing is finished, wherein the web browser unit is further instructed to instruct the print confirmation unit to initiate processing of confirming a progress of the print conversion processing for the selected document to the print server after the transmission of the conversion request, and disconnect the web browser unit from the print server, wherein the web browser unit analyzes a script contained in the HTML data, activates the print confirmation unit according to a result of the analysis of the script, provides instructions to the print confirmation unit for making the print confirmation unit confirm the progress of print conversion processing for the document to the print server, and if information indicating a storage location of the print data which was printed and stored by the client terminal is contained in the script, temporally stores the location information, and wherein the print confirmation unit activated by the web browser unit refers to the location information which is temporally stored to acquire the print data without connecting to the print server if the location information is temporally stored.

5. The method according to claim 4, wherein a print request for the document data is transmitted by the web browser unit after instructing the print confirmation unit to initiate processing of confirming a progress of the print conversion processing for the selected document to the print server even if printing of the print data is not complete.

6. The method according to claim 4, wherein, when the print confirmation unit is instructed to initiate processing of confirming a progress of the print conversion processing for the selected document to the print server, the document data is acquired by the print confirmation unit without confirming a progress of the print conversion processing to the print server if it is determined that the selected document has been printed previously.

* * * * *